(12) United States Patent
Hsu et al.

(10) Patent No.: US 9,548,799 B2
(45) Date of Patent: Jan. 17, 2017

(54) DISTRIBUTED CO-OPERATING NODES USING TIME REVERSAL

(71) Applicant: Ziva Corporation, San Diego, CA (US)

(72) Inventors: Mark Hsu, La Jolla, CA (US); David Smith, Ellicott City, MD (US); Jeremy Rode, San Diego, CA (US); Anis Husain, San Diego, CA (US)

(73) Assignee: ZIV A CORP., San Diego, CA (US)

( * ) Notice: Subject to any disclaimer, the term of this patent is extended or adjusted under 35 U.S.C. 154(b) by 360 days.

(21) Appl. No.: 14/247,229

(22) Filed: Apr. 7, 2014

(65) Prior Publication Data
US 2014/0301494 A1 Oct. 9, 2014

Related U.S. Application Data

(60) Provisional application No. 61/829,208, filed on May 30, 2013, provisional application No. 61/809,370, filed on Apr. 7, 2013.

(51) Int. Cl.
*H04B 7/02* (2006.01)
*H04W 56/00* (2009.01)
*H04B 7/06* (2006.01)

(52) U.S. Cl.
CPC .............. *H04B 7/026* (2013.01); *H04B 7/022* (2013.01); *H04W 56/001* (2013.01); *H04B 7/0617* (2013.01)

(58) Field of Classification Search
CPC ....... H04B 7/022; H04B 7/026; H04B 7/0617; H04W 56/001
See application file for complete search history.

(56) References Cited

U.S. PATENT DOCUMENTS

| 2011/0286508 | A1* | 11/2011 | Smith | ............... H04L 25/03343 375/224 |
| 2012/0117180 | A1* | 5/2012 | Ranasinghe | .......... H04J 3/0667 709/208 |
| 2012/0127020 | A1 | 5/2012 | Paek et al. | |

(Continued)

FOREIGN PATENT DOCUMENTS

| WO | 2007/059508 A1 | 5/2007 |
| WO | 2012/151316 A1 | 11/2012 |

*Primary Examiner* — Habte Mered
(74) *Attorney, Agent, or Firm* — Anatoly S. Weiser, Esq.; Techlaw LLP

(57) ABSTRACT

Dynamic, untethered array nodes are frequency, phase, and time aligned, and used to focus their transmissions of the same data coherently on a target, using time reversal. Alignment may be achieved separately for the radio frequency (RF) carriers and the data envelopes. Carrier alignment may be by phase conjugation. The data is distributed across the nodes. Data distribution and/or alignment may be performed by a Master node of the array. The nodes capture a sounding signal from the target, in the same time window. Each node converts the captured sounding signal to baseband, for example, using in-phase/quadrature downconversion. Each node stores the baseband samples of the sounding pulse. Each node convolves time-reversed samples of the sounding signal with the data, and upconverts the convolved data to radio frequency. The nodes emit their respective convolved and upconverted data so that the emissions focus coherently at the target.

16 Claims, 14 Drawing Sheets

(56) References Cited

U.S. PATENT DOCUMENTS

| | | | |
|---|---|---|---|
| 2012/0269204 A1* | 10/2012 | Zampetti | H04J 3/0667 370/503 |
| 2014/0241231 A1* | 8/2014 | Zeine | H04B 7/0617 370/312 |
| 2016/0020841 A1* | 1/2016 | Fireaizen | H01Q 3/2647 375/267 |

* cited by examiner

DISTRIBUTED CO-OPERATING NODES USING TIME REVERSAL

CROSS-REFERENCE TO RELATED APPLICATIONS

The present application claims priority from (1) U.S. Provisional Patent Application Ser. No. 61/829,208, entitled APPARATUS, METHODS, AND ARTICLES OF MANUFACTURE FOR COLLABORATIVE BEAMFOCUSING OF RADIO FREQUENCY EMISSIONS, filed on 30 May 2013; and (2) U.S. Provisional Patent Application Ser. No. 61/809,370, entitled APPARATUS, METHODS, AND ARTICLES OF MANUFACTURE FOR COLLABORATIVE BEAMFOCUSING OF RADIO FREQUENCY EMISSIONS, filed on 7 Apr. 2013. Each of these patent documents is hereby incorporated by reference in its entirety as if fully set forth herein, including text, figures, claims, tables, and computer program listing appendices (if present).

The present patent application is related to the following commonly-owned patent documents: U.S. Provisional Patent Application Ser. No. 61/481,720, entitled DISTRIBUTED CO-OPERATING NODES USING TIME REVERSAL FOR COMMUNICATIONS, SENSING & IMAGING, filed on 2 May 2011; U.S. Provisional Patent Application Ser. No. 61/540,307, entitled DISTRIBUTED CO-OPERATING NODES USING TIME REVERSAL FOR COMMUNICATIONS, SENSING & IMAGING, filed on 28 Sep. 2011; and U.S. Provisional Patent Application Ser. No. 61/881,393, entitled APPARATUS, METHODS, AND ARTICLES OF MANUFACTURE FOR COLLABORATIVE ARRAY COMMUNICATIONS INCLUDING BEAMFOCUSING OF EMISSIONS, filed on 23 Sep. 2013. Each of these patent documents is hereby incorporated by reference in its entirety as if fully set forth herein, including text, figures, claims, tables, and computer program listing appendices (if present).

FIELD OF THE INVENTION

This document relates generally to radio frequency (RF) communications and clock synchronization of untethered nodes.

BACKGROUND

The use of multiple transmit/receive antennas in wireless networks promises mitigation of interference and high spectral efficiencies through concentrating signals along a designated direction or transmission path. Compared to single-antenna-to-single-antenna transmissions, transmit beamforming may yield increased range (e.g., an N-fold increase for free space propagation), increased rate (e.g., an $N^2$-fold increase in a power-limited regime), increased power efficiency (e.g., an N-fold decrease in the net transmitted power for a fixed received power), and/or may allow splitting a high data-rate stream into multiple lower data-rate streams. (Here, N is the number of cooperative nodes or antenna elements at the transmit side.)

Distributed coherent RF transmit beamforming is a form of cooperative communication in which two or more information sources simultaneously transmit a common message, controlling the phase and delay of their transmissions so that the signals constructively combine at an intended destination. The term "beamforming" may also be used to indicate what is more commonly referred to as directional beamforming. In this case the information sources are configured to produce a beam that is approximately collimated in a given direction and the beam is not specifically focused to maximize power at any one location, but only in one direction. Phased arrays where the locations of the individual elements and the target receiver are known, where the array elements are interconnected with cables or other calibrated interconnections, and where a common centralized clock/time reference can be distributed among the array elements, can be configured to operate in such directional beamforming mode.

However, decentralized arrays, where the nodes are independent untethered devices with independent clocks i.e., without distributed clock or frequency reference, and where the positional coordinates are unknown, are much more difficult to use as coherent phased arrays, either in transmit mode or receive mode. For such systems of devices to operate as phased arrays, they should perform two major tasks.

First, as with any phased array, they must acquire the correct channel information between the array members and the intended target/source and provide a mechanism for the nodes to transmit/receive a correctly weighted signal at each of the array elements so that beamforming is achieved to within an accuracy required by the system.

Second, the array should implement a distributed algorithm across the members of the array that enables the array to operate in a coherent manner, providing phase, frequency, and time alignment of the clocks and oscillators of the different array members of the array. A correct method of producing this coordination of the array members is essential to the correct operation of the phased array.

Since multiple clocks are used across the array, the algorithm should operate fast enough to provide the required alignment within time limits determined by the clock coherence.

Even with atomic clocks, the clock coherence limit is eventually reached. In a phased array, exceeding the coherence limit may manifest as a random scrambling of the phases of the carrier waves utilized in the beamforming and hence a failure to achieve optimal or even minimally acceptable performance.

To correct for this, the algorithm should be compatible with the requirement that the system alignment be periodically refreshed to compensate for limited clock coherence and for operation of the array in dynamic and changing channels.

Another desirable characteristic is that the algorithm be capable of aligning the system (array members/elements/nodes) in a manner that minimizes the required information sharing and other communication between the array members.

In what follows, we will describe the arrays in transmit mode, for simplicity. But the ideas are easily applied to receive mode operations.

In general, existing implementations fall into three broad categories. First there are those categories where the array transmitters are required to determine or calculate the correct beamforming weights to focus at a known target and where the location of the transmitters and target is known. This is the most common type of phased array implementation and is often referred to as an "open-loop" array. Such implementation clearly requires time, frequency, and phase synchronization across the array. Because the various nodes may send signals at different times with different phase offsets, they should all agree on a common time base and a method for ensuring that the signals arrive at the target with their carriers at the same frequency and in perfect phase alignment to avoid fading. FIG. 7 illustrates selected elements of Open Loop Basic Array, wherein N untethered, randomly distributed array elements are configured to operate as a basic phased array to produce beamforming to a target location determined by the array itself. The formula in the Figure, $s(t)=\Sigma_{i=1}^{N}\alpha_i(t-(\tau_i+T))\cos(\omega(t-(\tau_i+T)))$, means that the signal at the target is a summation of the signals produced at the target by the elements i of the array, each with a time-dependent envelope $\alpha_i$, delayed by the corresponding time of flight ($\tau_i$+T). The array does not require communication (information flow as such) from the target location. It simply calculates the required delay offsets to ensure that the signals from each element are aligned at the target (some designated beamfocus point). The location of the target may be defined with respect to a reference point on the array, or elsewhere. When the locations of the array elements are fully known and the clocks of the elements are synchronized, it is relatively simple to operate such an array. If the clocks are not synchronized, and/or if the element locations are unknown, however, such arrays are not well suited for beamfocusing, because it is difficult or impossible to calculate how far the elements are from the focus point (the target), nor can it be accurately specified when each element should launch its signal. This array configuration would typically be used for LoS targets, since, by definition, the array has no information regarding the channel impulse response other than the simple straight line distance to the target. To focus in NLoS environments generally requires detailed knowledge of the channel impulse response of the NLoS channel. If this channel information could be made available for each node element through some other means (e.g., information flow from the target to the individual array elements), then it would be possible to focus to a NLoS environment. But this is not defined as part of the array configuration properties.

A second general category of array architectures is the "retrodirective array," described with reference to FIG. 8 and FIG. 9. The formula in FIG. 8 is the same one as in FIG. 7 ($s(t)=\Sigma_{i=1}^{N}\alpha_i(t-(\tau_i+T))\cos(\omega(t-(\tau_i+T))))$, and has the same meaning. In this array configuration, the array is assumed to be untethered and randomly distributed. The basic principle of the retrodirective array is that the signal acquisition phase (i.e., sounding process) enables the array to measure and calculate a set of relative delays $\tau_i$ of the signal coming from the target and arriving at each node. Conventional State of the art arrays attempt to measure the delays of the arriving signals and to send a signal in return where each array element is adjusted in time to compensate for this delay so that all the signals return to the target node at the same time. Proper design may enable a retrodirective array to operate with the full array gain. Retrodirective arrays generally can operate in NLoS channels (as well as in LoS channels), since the array elements have the information about the NLoS channel from the sounding process and channel reciprocity. The knowledge of the X, Y, Z coordinates of the array elements is not required for proper operation of the main channel between the cooperative array and the target. Accurate clock synchronization, however, is needed.

This type of array is not strictly open loop, since it requires a sounding pulse or an opportunistic signal detected from the target. It is also not a closed loop system in the conventional sense, since there is no transmission of information or messages back and forth between the array and the target for control and alignment purposes (see concept of cooperative arrays below). In a closed-loop system, the target receiver determines what alignment is required by the transmitter nodes and sends that information back to the transmitters. In the system described above, the transmitter array determines the correct procedure and need not receive feedback from the target receiver informing it how well aligned the system (the array) is.

In principle, all control of the operation of the array may be performed at the array end, and the sounding pulse is simply a way to acquire channel information. This type of array may be very important in dynamic array configurations in noisy environments. Because the array operation does not require information transmission across the channel for alignment purposes, it may be less susceptible to jamming and interference. The process of clock synchronization of independent and untethered clocks, however, does require transmission of information back and forth between the array elements, and may present a challenge and be susceptible to interference.

In a third category of array architectures, the target receiver is capable of communicating with each transmit array node, and the target can determine when optimal beamforming has been achieved. In such array configurations, the array is assumed to be untethered and randomly distributed (ad hoc). The target is assumed to be a cooperative node and be capable of sending information to the array. The array operation can be controlled, for example, from the target or from the array itself, but the assumption is that a full closed loop operation is used that enables effective alignment, when both ends of the channel are capable of communicating information relevant to the beamfocusing operation. It is usually assumed that the target has the ability to determine when optimal beamforming has been achieved. For example the target may be able to assess the power density of the focused spot, or it may be able to measure BER in a communication system. It may also be required to determine from this signal how to adjust the required parameters of the array to optimize or improve the beamforming and to be able to communicate appropriate signals to the array to achieve this goal. It is the responsibility of the target to return control signals to the transmitters instructing them to modify their beamforming weights until the target determines that optimal beamforming has been achieved. Systems like these are often referred to as "closed-loop" systems. In this approach, neither the transmitters nor the receiver may have perfect channel state information, but there is a low-rate feedback link from the receiver to the transmitters. In various applications this arrangement may not require time or phase synchronization across the members of the array because the receive node is assumed to be capable of instructing the transmitters to adjust their parameters to achieve an optimal alignment.

Time synchronization across the array elements might make the performance of such arrays much faster and simpler, but it is not required, because the target may attempt to determine the clock properties of each array element and send its delay correction information in a manner that takes into account the clock properties of each array member. The target may be responsible for handling the synchronization of the array, since it is uniquely positioned to determine the array performance and how the performance responds to changes at the array end of the channel.

This type of array configuration typically demands a large alignment overhead and may have problems rapidly adapting to motion or changes in the channel properties. It may also be susceptible to jamming and interference, since it requires a low error rate communication channel to be available between opposite ends of the channel between the target and the array.

Irrespective of the particular category described above, the resultant beam shape at the receiver may resemble a phased-array radiation pattern, with one main lobe and multiple undesired side lobes that cause interference. In conventional phased-array systems, it may also be difficult or impossible to support coherent addition of wave-fronts in multipath (MP) environments, and most beamforming approaches assume line-of-sight (LoS) links between transmitters and receiver.

The problem of array alignment becomes rather difficult when the individual member of the transmitter array are free to move with respect to each other, and do not share a common local oscillator (LO) reference, because the phases/frequencies may vary from one array member to another, and because the timing of transmission may change as the elements move with respect to each other and with respect to the receiver, as is typical in dynamic environments. The movements and changes in the channel may seriously degrade the alignment required for reliable collaborative communications in an ad hoc array system.

Needs exist in the art for improved communication techniques for distributed coherent communications, and for apparatus, methods, and articles of manufacture enabling such improved communications. Needs exist in the art for phase/frequency synchronization techniques that can be used in ad hoc nodes of a distributed transmitter array for coherent transmissions.

SUMMARY

Embodiments, variants, and examples described in this document are directed to methods, apparatus, and articles of manufacture that may satisfy one or more of the above described and/or other needs.

In an embodiment, a method of configuring a plurality of radio frequency transmission nodes into a distributed time reversal mirror for transmitting to a target includes: (1) step for phase alignment of local clock references of all nodes of the plurality of radio frequency transmission nodes; and (2) step for frequency alignment of the local clock references of all nodes of the plurality of radio frequency transmission nodes.

In an embodiment, a method of configuring a plurality of radio frequency transmission nodes into a distributed time reversal mirror for transmitting to a target includes aligning phases of local clock references of all nodes of the plurality of radio frequency transmission nodes. The method also includes aligning frequencies of the local clock references of all nodes of the plurality of radio frequency transmission nodes. The method additionally includes aligning time references of all nodes of the plurality of radio frequency transmission nodes. The method further includes distributing common data for transmission to the target across the plurality of nodes. The method further includes receiving, at each node of the plurality of nodes, a sounding signal from the target within a common time capture window. The method further includes generating, at said each node, a time-reversed sounding signal at carrier frequency, the time-reversed sounding signal of said each node being generated by sample-reversal of the common time capture window at baseband and phase-conjugation at carrier frequency. The method further includes convolving, at said each node, the common data with the time-reversed sounding signal, thereby obtaining a transmission signal of said each node. The method further includes transmitting, from said each node, said transmission signal of said each node, wherein the step of transmitting is performed at the same time from all the nodes of the plurality of nodes for coherent time-reverse focusing on the target in time and space. In aspects, I/Q processing is used.

In an embodiment, the plurality of nodes includes a master node and at least two slave nodes, and the method further includes configuring the at least two slave nodes to focus time-reversed master sounding emissions on the master node in time and space, and attempting to optimize reception of the emissions at the master node. The steps of configuring and attempting are performed before the step of transmitting.

In an embodiment, a node includes an antenna, a radio frequency transceiver coupled to the antenna, a local oscillator, and a processor coupled to the transceiver to control operation of the transceiver. The node is part of a plurality of nodes. The node includes a means for phase alignment of the local oscillator with the local oscillators of other nodes of the plurality of nodes. The node also includes a means for frequency alignment of the local oscillator with of the local oscillators of the other nodes of the plurality of nodes. In aspects, the node is configured to: (1) obtain common data for transmission from the plurality of nodes to a target; (2) receive a sounding signal from the target within a time capture window common to the plurality of nodes; (3) generate a time-reversed sounding signal at carrier frequency using sample-reversal of the time capture window at baseband and phase-conjugation at carrier frequency; (4) convolve the common data with the time-reversed sounding signal, thereby obtaining a transmission signal; and (5) transmit the transmission signal, wherein all the nodes of the plurality of nodes transmit simultaneously for coherent time-reverse focusing of transmissions carrying the common data on the target in time and space. In aspects, the node is configured to generate the time-reversed sounding signal and to convolve the common data using I/Q processing.

In an embodiment, an article of manufacture has machine-readable storage medium with program code stored in the medium in a non-volatile manner. When the program code is executed by at least one processor of a radio frequency communication node that has an antenna, a radio frequency transceiver coupled to the antenna, a local oscillator, and a processor coupled to the transceiver to control operation of the transceiver, it configures the node to perform a number of tasks. The node is part of a plurality of nodes. The tasks include phase alignment of local clock references of all nodes of the plurality of radio frequency transmission nodes, frequency alignment of the local clock references of all nodes of the plurality of radio frequency transmission nodes, and time alignment of the nodes. The tasks may further include obtaining common data for transmission from the plurality of nodes to a target; receiving a sounding signal from the target within a time capture window common to the plurality of nodes; generating a time-reversed sounding signal at carrier frequency, the time-reversed sounding signal being generated by sample-reversal of the time capture window at baseband and phase-conjugation at carrier frequency; convolving the common data with the time-reversed sounding signal, thereby obtaining a transmission signal; and transmitting said transmission signal, wherein the step of transmitting is performed at the same time from all the nodes of the plurality of nodes for coherent focusing on the target in time and space.

These and other features and aspects of the present invention will be better understood with reference to the following description, drawings, and appended claims.

DETAILED DESCRIPTION

Figure 1:
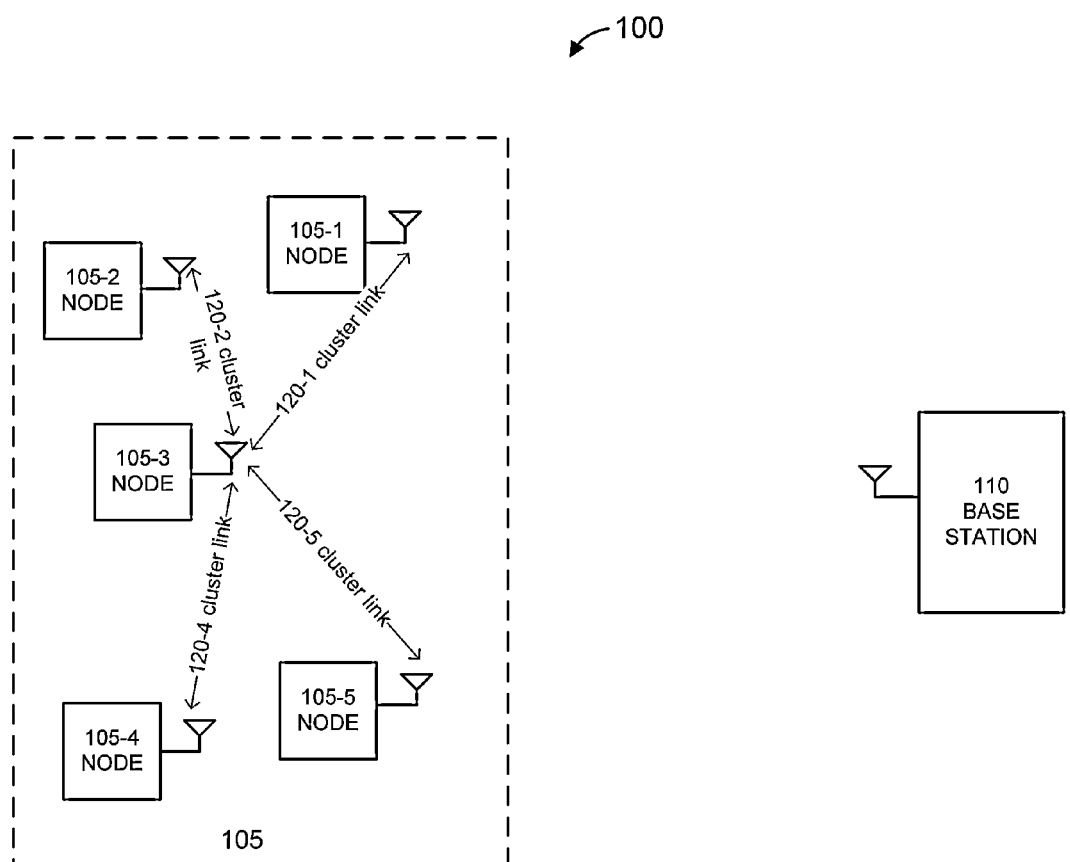
FIG. 1 illustrates selected components of a communication arrangement.

In this document, the words "embodiment," "variant," "example," and similar words and expressions refer to a particular apparatus, process, or article of manufacture, and not necessarily to the same apparatus, process, or article of manufacture. Thus, "one embodiment" (or a similar expression) used in one place or context may refer to a particular apparatus, process, or article of manufacture; the same or a similar expression in a different place or context may refer to a different apparatus, process, or article of manufacture. The expression "alternative embodiment" and similar words and expressions are used to indicate one of a number of different possible embodiments, variants, or examples. The number of possible embodiments, variants, or examples is not necessarily limited to two or any other quantity. Characterization of an item as "exemplary" means that the item is used as an example. Such characterization does not necessarily mean that the embodiment, variant, or example is preferred; the embodiment, variant, or example may but need not be a currently preferred embodiment, variant, or example. All embodiments, variants, and examples are described for illustration purposes and are not necessarily strictly limiting.

The words "couple," "connect," and similar expressions with their inflectional morphemes do not necessarily import an immediate or direct connection, but include within their meaning connections through mediate elements.

References to "receiver" ("Rx") and "transmitter" ("Tx") are made in the context of examples of data transmission from the transmitter to the intended or target receiver. For time reversal communication techniques, the intended or target receiver may need to transmit to the transmitter a sounding signal, e.g., a pulse/burst or a pilot signal, and the transmitter may need to receive the sounding signal. Moreover, data communications can be bi-directional, with transceivers on both end nodes. In this document, the nodes of a cooperative array are "transmitters" of data, which they transmit to an "intended receiver" (or "targeted receiver," "target Rx," or simply "target"), such as a base station. The roles may be reversed, with the cooperative array (or any of its nodes) also or instead being the intended or targeted receiver. In the event that the intended meaning is different, we will specify explicitly, in context, what configuration is being assumed.

The expression "processing logic" should be understood as selected steps and decision blocks and/or hardware for implementing the selected steps and decision blocks. "Decision block" means a step in which a decision is made based on some condition, and process flow may be altered based on whether the condition is met or not.

Array "nodes," "elements," and "members" are used interchangeably.

Other and further explicit and implicit definitions and clarifications of definitions may be found throughout this document.

Reference will be made in detail to several embodiments that are illustrated in the accompanying drawings. Same reference numerals may be used in the drawings and this description to refer to the same apparatus elements and method steps. The drawings are in a simplified form, not to scale, and omit apparatus elements and method steps that may be added to the described systems and methods, while possibly including certain optional elements and/or steps.

Various communication techniques described in this document employ time reversal (TR) to facilitate transmission and reception through physical channels that are not necessarily known a priori, and that may continually vary. Time reversal uses the reciprocity property of wave equations. Time reversal is described, for example, in the patent documents incorporated by reference above. Briefly, in a system that uses time reversal, a pilot or an opportunistic sounding signal (e.g., a sounding burst) is sent from the target antenna of the Rx to the Tx; the Tx receives the sounding signal and captures in its analog-to-digital converter (ADC) the Channel Response (CR) of the channel between the Rx antenna and the Tx. The Tx may then be configured to send data back to the Rx by convolving the data with the time-reversed version of the captured CR. Standard modulation techniques may be used to apply the data to the signal by convolving a binary data stream with the time-reversed CR (TR-CR). For example, the Tx may be configured to use the TR-CR as its data pulse/burst. When the TR-CR is launched back down the same channel by the Tx, the actual physical channel that created the multipath now acts as its ideal (or near ideal, as the case may be in the real world) spatial-temporal matched filter and becomes a perfect (or near perfect) equalizer for the signal, creating a pulse at the intended receiver that captures much of the energy present in the original CR. In effect, this can create significant multipath gain. Communication systems employing TR also have the flexibility to operate in 1×N, M×1, or M×N antenna configurations, with the ability to derive additional gain over and above the MP gain. The systems can focus a signal both spatially and temporally at a designated point in space, within the diffraction limits. They can operate with no LoS visibility of the receiver, no knowledge of the location of the receiver, and no array or dish antenna at the transmit end of the link. Additionally, there is no requirement to sweep or scan the Tx array, and the process does not require complex space-time algorithmic processing or calculation, or implementation of a Rake filter to remove the signal distortion created by long MP decay times.

The sounding signal may be a sharp pulse approaching an impulse, a Gaussian pulse, chirp, barker code, Gold code, or another appropriate burst with substantially flat frequency response in the communication band, and having a good autocorrelation function (i.e., approaching that of an impulse function), as is known in communication theory and related fields (e.g., CDMA, autocorrelation radar).

FIG. 1 illustrates in a high level, block-diagram manner, selected components of a communication arrangement 100. This arrangement includes an array of ad hoc nodes 105 that may communicate with each other. The nodes may communicate using peer-to-peer (node-to-node) communications or through a selected node such as a master node described below. There is no requirement that each of the nodes be capable of communicating with each other node, though some embodiments implement such communications. The selected node, however, may communicate with each other node. Note that the selected node designation may change in the course of operation, that is, a different node may become a selected or master node. As shown, the array 105 includes five distributed cooperating nodes, 105-1 through 105-5. In similar arrangements, the array 105 may include any number of a plurality of nodes 105, for example, 2, 3, 4, 5, 6, 7, 8, 9, 10, or more. The arrangement 100 also includes a base station 110. The nodes 105 may represent transceivers of different soldiers of a squad, and the base station 110 may be a transceiver of a command center in a Humvee, tank, or another local headquarters or control center. (The term "base station" may have operational significance in some implementations, but in this document its technical meaning is the same as the meaning of "target receiver" defined above; it may simply be a communication system to which the array intends to direct its communications.)

The nodes 105 may be within Line-of-Sight (LoS) of each other and can communicate directly with each other via array links 120. Although links 120-1, 120-2, 120-4, and 120-5 are shown as connecting the node 105-3 to each of the remaining node 105, this is an exemplary arrangement; more generally, any of the nodes 105 may be connected by such array link 120 to any of the other nodes 105. The array links 120 may be implemented, for example, using short-range RF link such as a Bluetooth® link, WiFi, or other short-, medium-, and longer-range technologies. The technologies of the array links 120 may be standardized or proprietary.

The nodes 105 may be ad hoc, meaning that (1) they are free to move and rotate not only relative to the base station 110 and/or the environment, but also relative to each other; and (2) they are not hardwired and do not share a common physical LO. The distances between any two of the nodes 105 are typically much smaller (by a factor of 10, 100, 1000, or another large number, for example) than the distance between any of the nodes 105 and the base station 110. Additionally, the nodes 105 are not tethered to each other, in the sense that each of the nodes may operate using its own physical time reference or LO, and the antennas of the different nodes 1-5 are not electrically/physically connected to each other. Each of the nodes 105 may have a single antenna, or multiple antennas.

Figure 2:
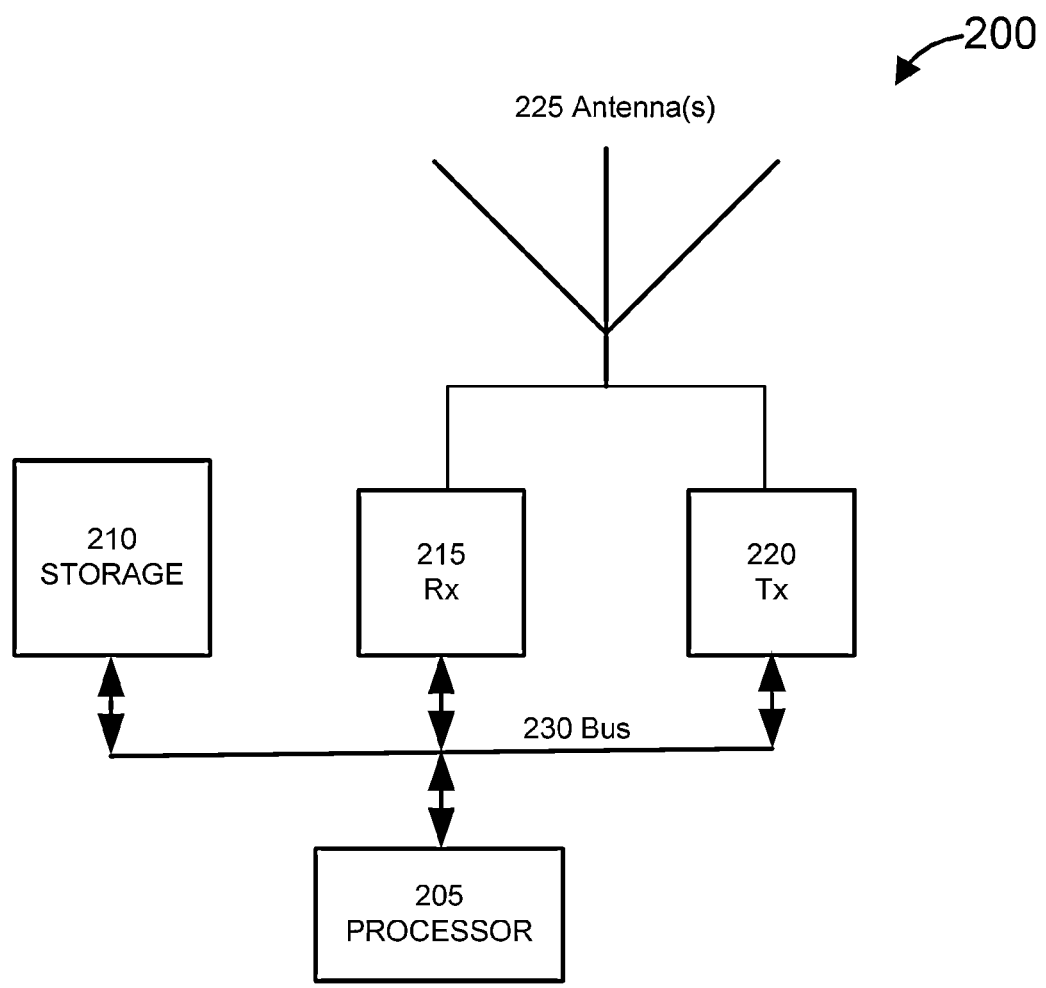
FIG. 2 illustrates selected elements of a communication apparatus configured in accordance with one or more features described in this document.

FIG. 2 illustrates selected elements of an apparatus 200 configured in accordance with one or more features described in this document. The apparatus may be any of the cooperative transceivers 105 and/or the base station 110. The apparatus may include a processor 205; a storage device 210 (which may store program code for execution by the processor 205); a receiver 215 configured to receive radio frequency transmissions (including scattered/MP transmissions) from one or more other transceivers/base stations; a transmitter 220 configured to transmit radio frequency transmissions to the other transceivers/base stations; and one or more transmit and receive antennas 225 coupled to the receiver 215 and the transmitter 220. A bus 230 couples the processor 205 to the storage device 210, the receiver 215, and the transmitter 220; and allows the processor 205 to read from and write to these devices, and otherwise to control operation of these devices.

The nodes 105 are configured to communicate coherently (in a synchronized manner) with the base station 110. The communication is "coherent" in the sense that the nodes 105 can transmit the same data to the base station 110 in a synchronized manner so that the radio frequency transmissions from all or a plurality of the nodes 105 add coherently in time and space at the receiving antenna(s) of the base station 110. Note that the concept of "synchronization" does not necessarily require explicit knowledge by the nodes of their relative phases (but may include such explicit knowledge); it does mean knowledge sufficient to launch the emissions from the nodes so that the emissions focus in time/space (combine constructively) on the target receiver.

We next discuss certain considerations for designing distributed beamforming systems using up/down conversion transceivers.

Figure 3:
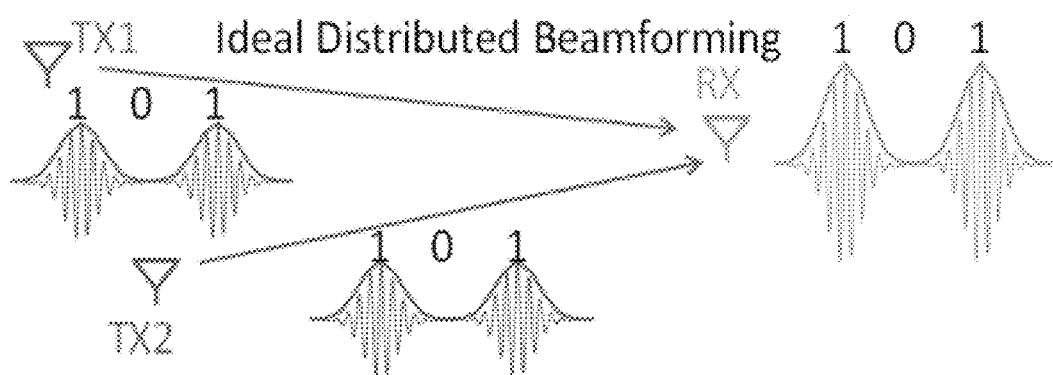
FIG. 3 illustrates distributed beamforming.

FIG. 3 illustrates antennas TX1 and TX2 of two distributed nodes (such as the nodes 105 of FIG. 1). The antennas TX1 and TX2 transmit to an antenna RX of the target receiver (such as the base station 110). The transmitted waveforms have shared data ("1 0 1" in the example shown in the Figure). The transmit times and the paths from the node antennas TX1 and TX2 to the target receiver antenna RX are such that the transmissions add coherently in time Hand space at the target receiver antenna RX. By adding coherently, we mean that the symbol/modulation envelopes and the underlying carriers of the separate TX1 and TX2 signals emitted from the respective TX1/TX2 antennas arrive simultaneously at the targeted receiver antenna RX (before receive circuitry). When both the symbol (envelope) alignment and carrier alignment perfectly overlap at the RX, the distributed array may achieve perfect or near perfect array gain at the intended receiver antenna RX, as is shown in FIG. 3. If these conditions are not met, the emitted signals from TX1 and TX2 will not arrive coherently at the RX and array gain will not be achieved (including the possibility of destructive interference with its attendant signal attenuation relative to reception of a single transmitter signal).

The use of TR at the transmit array nodes may solve this alignment problem. In certain implementations of this technology the transmit nodes capture the entire sounding signal, e.g., the pulse envelope and underlying carrier frequency, and time reverse both of these components. This requires that digital storage mechanisms in the analog-to-digital (A/D) converter chain in the transceivers located at the transmit nodes are capable of capturing the entire carrier frequency. For example, if the sounding pulse is a one microsecond wide Gaussian pulse on a 60 GHz carrier, minimal digital resources may be needed to capture the pulse envelope, but it may far exceed the capability of most commercial A/D converters to capture the 60 GHz carrier. Consequently, the systems of interest typically downconvert the incoming signal to a much lower frequency (the intermediate frequency or simply IF) or to baseband (substantially zero frequency) before capturing it in the digital sampling infrastructure. It is the downconverted component that is then subsequently time-reversed. This lower bandwidth time-reversed channel response (TR-CR) is then upconverted back to the correct carrier frequency before retransmission to the target. However, the use of Local Oscillators (LOs) at the nodes to produce the upconversion and downconversion creates a level of complexity in the array time-reversal process that requires additional alignment and imposes synchronization requirements between the nodes that are not required in the simpler TR process. The array beamforming process may address beamforming through alignment of (1) the carrier, and (2) the lower bandwidth modulation envelopes, separately.

Below, we address the specific implementations of TR arrays that operate in heterodyne or homodyne mode using upconversion and downconversion with LOs, and compare how the system may operate with or without the conventional in-phase and quadrature (I/Q) detection techniques that are standard for many communication applications. As may be appreciated by a person skilled in the art after perusing this document and the attached Figures, although I/Q detection is used in the industry, its use in ad hoc arrays is not a straightforward matter.

The underlying assumption of TR communications is that the target is able to emit a sounding signal which can be detected by each array element. (It may of course happen that some array elements do not detect it, for whatever reason; the remaining elements may then be considered as the "array.") There is no assumption that the array and the target are cooperative, hence the "sounding pulse" may actually be an opportunistic signal (of whatever shape) acquired by the array. In cooperative applications (where the target and the array cooperate), the signal may be a pilot data sequence or other specially tailored pulse or other format. Whatever the nature of the target's transmission, we may refer to it here as a sounding "pulse," although it should be understood that the actual signal need not be a single pulse. How the pulse is processed generally depends on the intended application of the array. In communications applications, for example, it may be necessary for each array element to deconvolve the channel impulse response from the acquired sounding signal. In power focusing applications, this may not be necessary.

In operation, the array receives a sounding signal emitted from the target. We denote the sounding signal by $q(t)=A(t)\cos(\omega_1 t+\psi)$, with the total pulse duration $T_0$ and carrier frequency $\omega_1$. We arbitrarily define the reference time $t=0$ at the target. Since one LO is used at the target and a different LO at each array node, a phase offset difference between the different nodes (as well as between each of the array nodes and the target) must be allowed for, even if identical frequencies are somehow guaranteed, unless there is another means for synchronizing the phases. Without loss of generality, let us assume the phase $\psi=0$. If the LO at the target is designated by $p_{RX}(t)=\cos(\omega_1 t)$, the LO at a node of the transmit array may be designated by $p_{TX}(t)=\cos(\omega_0 t+\phi_c)$.

We now pass the signal $q(t)$ through a multipath channel and obtain at the jth transmit array node $TX_j$ $$s_j(t) = \sum_{i=1}^{n} \alpha_{i,j} A(t - \tau_{i,j})\cos(\omega_1(t - \tau_{i,j})).$$

To simplify notation, for now, let us examine the expression for a single Tx antenna, which permits us to drop the j index temporarily. We can re-write the previous formula:

$$s(t) = \sum_{i=1}^{n} \alpha_i A(t - \tau_i)\cos(\omega_1(t - \tau_i)).$$

It can be written in IQ format as $$s(t) = \sum_{i=1}^{n} [\alpha_i A(t - \tau_i)\cos(\omega_1 \tau_i)]\cos(\omega_1 t) + \sum_{i=1}^{n} [\alpha_i A(t - \tau_i)\sin(\omega_1 \tau_i)]\sin(\omega_1 t),$$

which is equivalent to $$s(t)=I(t)\cos(\omega_1 t)+Q(t)\sin(\omega_1 t),$$

where $$I(t) = \sum_{i=1}^{n} [\alpha_i A(t - \tau_i)\cos(\omega_1 \tau_i)]$$

$$Q(t) = \sum_{i=1}^{n} [\alpha_i A(t - \tau_i)\sin(\omega_1 \tau_i)].$$

Standard IQ processing allows recovery of I(t) and Q(t) by first splitting the signal s(t) into two copies, multiplying each copy by quadrature Local Oscillator signals $\cos(\omega_0 t+\phi_c)$ and $\sin(\omega_0 t+\phi_s)$, and capturing each result of the multiplication separately in a sampling device with a sampling frequency at least 2× the highest frequency component in the signal. This is the downconversion process referred to above. In practice, $\phi_c$ and $\phi_s$ can be made equal, even if they cannot be eliminated but we will handle them separately at this stage to preserve generality. In general, each Tx node will have a different value of $\phi_c$ and $\phi_s$, and it may be shown that it is precisely these different values that may be aligned as part of the array alignment process. Two distinct signals result from the downconversion:

$$s_c(t)=0.5(I(t)\cos [(\omega_1-\omega_0)t-\phi_c]+Q(t)\sin [(\omega_1-\omega_0)t-\phi_c])$$

$$s_s(t)=0.5(Q(t)\cos [(\omega_1-\omega_0)t-\phi_s]-I(t)\sin [(\omega_1-\omega_0)t-\phi_s]).$$

This result assumes that any terms with $(\omega_1+\omega_0)$ can be substantially removed by filtering. In general, the $(\omega_1-\omega_0)$ terms are intermediate frequency terms, which can be captured in the sampling device, and may be useful for additional processing. The special case where $\omega_1=\omega_0$ represents downconversion to baseband. In general, when $(\omega_1-\omega_0)=0$ we refer to the system as a homodyne system, and when $(\omega_1-\omega_0)\neq 0$ we refer to the system as a heterodyne system. When these terms are used we normally assume that the frequency difference in a heterodyne system is a determinsitic and significant frequency. Other issues may arise when $(\omega_1-\omega_0)\approx 0$, i.e., in a nominally homodyne system with unintended small frequency offsets due to errors.

Because of the multipath, it may not be possible to remove the terms $\cos(\omega_1 \tau_i)$ and $\sin(\omega_1 \tau_i)$ by squaring and adding, due to the many cross-terms that arise when the summation terms are squared. Hence, these terms are fading terms which will vary randomly depending on the multipath details. It is the presence of significant multipath that may prevent conventional I/Q from operating correctly.

Time Reversal

At this stage, two separate signals $s_c(t)$ and $s_s(t)$ have been captured. Their frequencies are low enough to allow their capture and digitization to be performed in an A/D converter. The signals are then time-reversed. Time reversal of a signal means that the direction of the signal is reversed by applying the transformation t→−t. To do this properly, however, the correct delay should be carefully applied to the outgoing signal.

Consider the following explanation. A pulse φ(t) is defined at some point t=0 and transported to a location where it arrives at some time $\tau_i$ later. We denote the "transport" function by φ(t')=φ(t−$\tau_i$). If we reverse the pulse and define the pulse by φ'(t)=φ(−t) and transport it to the same location, we now describe the pulse by φ'(t'=φ($\tau_i$−t).

Figure 13:
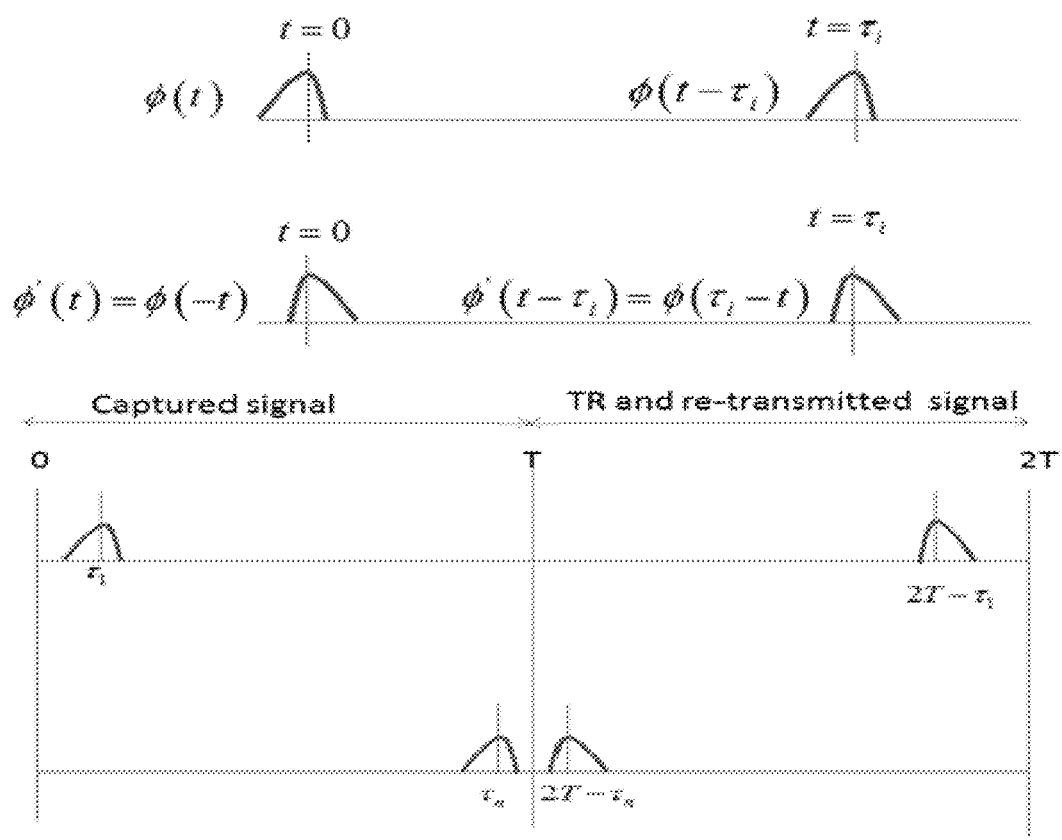
FIG. 13 illustrates selected aspects of time-reversal transform and retransmission.

When this is applied to a sequence of multipath delayed pulses as shown in FIG. 13, in the simplest implementation everything is captured in a time frame ranging from t=0 to t=T where T is long enough to capture all or practically all the multipath echoes. The principle of the technique is that in TR this signal is read out of the sampler (storage buffer) starting at time t=T as is illustrated (or at a later time T+$t_{inc}$), and the read-out of the signal proceeds in reverse (last in, first out), continuing till time t=2T (if the read out started at T; otherwise, till t=2T+$t_{inc}$), i.e., the whole frame is read out in reverse as soon as a frame of length T is acquired (or after a delay $t_{inc}$; in the following discussion, we assume $t_{inc}$=0). As will be seen below, when this process is applied across an entire array of Tx nodes of an array, it essentially implements the same process for each node as described above for a single node, but the time T is identical for each node, implying the need for time synchronization across the array.

After time-reversal, the I/Q terms can now be written as follows:

$$I^{TR}(t) = \sum_{i=1}^{n} [\alpha_i A((2T - \tau_i) + m\Delta t - t)\cos(\omega_1 \tau_i)]$$

$$Q^{TR}(t) = \sum_{i=1}^{n} [\alpha_i A((2T - \tau_i) + m\Delta t - t)\sin(\omega_1 \tau_i)].$$

Before setting forth the formula for the entire signal returning to the target, it should be recognized that if the system is used for data transmission there may be multiple data bits transmitted at different times. Hence in practice we need to convert t→2T+mΔt−t, where mΔt denotes the delay of the mth bit, m=0 denotes the first pulse/bit, and Δt denotes the data pulse/bit period. Hence, cos [($\omega_1$−$\omega_0$)t−$\phi_c$]→cos [($\omega_1$−$\omega_0$)(2T+mΔt−t)−$\phi_c$].

Thus we have time reversed signals:

$s_{c,m}^{TR}(t)=0.5(I^{TR}(t)\cos [(\omega_1-\omega_0)(2T+m\Delta t-t)-\phi_c]Q^{TR}(t)\sin [(\omega_1-\omega_0)(2T+m\Delta t-t)-\phi_c])$ $s_{s,m}^{TR}(t)=0.5(Q^{TR}(t)\cos [(\omega_1-\omega_0)(2T+m\Delta t-t)-\phi_s]-I^{TR}(t)\sin [(\omega_1-\omega_0)(2T+m\Delta t-t)-\phi_s]).$ These signals may be kept separate at the Tx node of the array. However, in order to transmit the signals back to the RX target, first IQ is upconverted by multiplying each signal by the LO of frequency $\omega_0$ (or a different carrier frequency) and difference the terms, giving a resultant signal:

$s_m'(t)=s_{c,m}^{TR}(t)\cos(\omega_0 t+\phi_c')-s_{s,m}^{TR}(t)\sin(\omega_0 t+\phi_s').$ Note that for generality we denote the phase offset of the outgoing LO as φ' rather than φ because we may wish to change the phase of the LO applied to the outgoing signal compared to the LO phase applied to the incoming signal. For example, in embodiments the outgoing phase is a conjugated version of the input phase. This means that the following signal may be launched:

$$s_m'(t) = 0.5 \left\{ \begin{array}{l} \sum_{i=1}^{n} [\alpha_i A((2T + m\Delta t - \tau_i) - t)\cos(\omega_1\tau_i)]\cos(\omega_1(2T + \\ m\Delta t - t) - \omega_0(2T + m\Delta t) - \theta) + \sum_{i=1}^{n} [\alpha_i A((2T + m\Delta t - \tau_i) - \\ t)\sin(\omega_1\tau_i)]\sin(\omega_1(2T + m\Delta t - t) - \omega_0(2T + m\Delta t) - \theta) \end{array} \right\},$$

where $\theta = \phi_c + \phi'_c = \phi_s + \phi'_s$. To propagate a time-reversed signal back to the target, a transformation t→t−$\tau_i^R$ is applied. At the peak of the TR signal, all the delays are equalized, i.e., $\tau_i^R$−$\tau_i$=0 for all values I (perfect reciprocity). In practice, if reciprocity is not perfectly maintained this term may not equal zero and may create noise and fading effects. The full expression for the signal arriving at the RX target is shown below, with simplifying assumption that only the components that come up along path i and return along path i are aligned (i.e., ignoring the components that come up path i and return on a different path j):

$$p(t) = 0.5A(2T + m\Delta t - t)$$
$$\sum_{i=1}^{n} \alpha_i \left[\left[ \begin{array}{l} \cos(\omega_1\tau_i)\cos(\omega_1(2T + m\Delta t - t + \tau_i) - \omega_0(2T + m\Delta t) - \theta) + \\ \sin(\omega_1\tau_i)\sin(\omega_1(2T + m\Delta t - t + \tau_i) - \omega_0(2T + m\Delta t) - \theta) \end{array} \right]\right].$$

Restating this result, we obtain:

$$p(t) =$$
$$0.5A(2T + m\Delta t - t)[\cos(\omega_1(t - (2T + m\Delta t)) + \omega_0(2T + m\Delta t) + \theta)]\sum_{i=1}^{n}\alpha_i.$$

Restating again, we get p(t)=0.5γA(2T+mΔt−t)cos($\omega_1$t−($\omega_1$−$\omega_0$)(2T+mΔt)+θ), where the TR process has eliminated the channel specific phase offset $\omega_1\tau_i$ not only for the LoS channel from the Tx array node to the RX target, but also all the multipath channels incorporated in the channel model. Note that there is now no term left that depends on the channel propagation delay τ. Hence, the TR process, even when reduced to baseband, intrinsically and automatically performs phase conjugation that eliminates the propagation phase offset of the main channel. The only remaining term that is channel specific is $$\gamma = \sum_{i=1}^{n}\alpha_i,$$

which is the channel loss/gain term with multipath gain included. This phase conjugation is applied simply by applying the time-reversal process and requires no additional phase conjugation process.

This signal may be split into two copies and combined with quadrature local oscillators cos($\omega_1$t) and sin($\omega_1$t), reducing the signal back to baseband, as shown below:

$$p_I(t) = \frac{1}{2\sqrt{2}}\gamma A(2T + m\Delta t - t)\cos(\omega_1 t - (\omega_1 - \omega_0)(2T + m\Delta t) + \theta)\cos(\omega_1 t)$$
$$= \frac{1}{2\sqrt{2}}\gamma A((2T + m\Delta t) - t)\cos(\theta - (\omega_1 - \omega_0)(2T + m\Delta t))$$

-continued $$p_Q(t) = \frac{1}{2\sqrt{2}} \gamma A(2T + m\Delta t - t)\cos(\omega_1 t - (\omega_1 - \omega_0)(2T + m\Delta t) + \theta)\sin(\omega_1 t)$$

$$= -\frac{1}{2\sqrt{2}} \gamma A((2T + m\Delta t) - t)\sin(\theta - (\omega_1 - \omega_0)(2T + m\Delta t))$$

Remembering that this still represents the signal due to a single Tx node of the array, it may be seen that there is a phase term which produces fading:

$$\theta - (\omega_1 - \omega_0)(2T + m\Delta t).$$

This phase term has three components, to wit:

1. The first component is $\theta$, which is produced by the difference of the phase of the LO at the Tx node of the array and the phase of the LO at the RX target. Hence, fading is sensitive to a phase difference across the entire channel between Tx and RX node.

2. The second component is $(\omega_1-\omega_0)(2T)$, a static term which may occur in a heterodyne system and is a term that effectively represents the continual accumulation of phase of the IF frequency in a heterodyne mode.

3. The third component is $(\omega_1-\omega_0)(m\Delta t)$, which is a continually accumulating phase as the IF frequency continues to change for every successive data pulse emitted.

Under these circumstances, the RX array node may be configured to use I/Q detection to eliminate the phase fading. This would provide a signal $$P(t) = \sqrt{(p_I(t)^2 + p_Q(t)^2)} = \frac{1}{2\sqrt{2}}[\gamma A((2T + m\Delta t) - t)].$$

Alternatively, if the system can operate in homodyne mode we are left only with the first term $\theta$. Since this represents a phase difference between the LOs at different ends of the channel, the phase of the LO at the Tx node of the array or the RX target may be adjusted until this term is reduced to $2\pi n$, where n is an integer. We refer to this as dynamic channel phase alignment.

There is one additional technique that may be applied in a homodyne channel that removes the need for I/Q detection at the RX target.

If the RX target detects the signal using only a cosine LO and no I/Q detection, the detected signal can be written as $P(t)=\gamma A((2T+m\Delta t)-t)\cos(\theta)$. Recall that we earlier defined $\theta=\phi_c+\phi'_c$. Without I/Q detection or dynamic phase alignment, there is no simple way to remove this term. However, if we arrange the outgoing LO to be a phase conjugated version of the incoming LO, then we have $\phi_c=-\phi'_c \Rightarrow \theta=0$ under all cases.

It should be understood that this phase conjugation process is an additional phase conjugation over and above the phase conjugation that is inherently applied by the time-reversal process. In a system that produces downconversion and upconversion as described above, this is performed outside of the TR process, and so there is a component of the LO phase that is not automatically phase-conjugated by the TR process and requires to be separately phase conjugated. By separating the two aspects requiring phase conjugation and by applying time reversal to perform the phase conjugation that removes the phase distortions from the propagation path, a system is implemented that allows performance of the phase conjugation of the Local Oscillators with a simple manipulation of the signal that can be performed in the signal processing infrastructure.

We will now apply the results which we derived above for a channel between a single Tx node in an array and the RX target, to the entire Tx array of N distributed array members. Note that the array members/nodes may be ad hoc nodes, as that term was previously defined.

It was disclosed above that the TR process removes any channel specific phase terms from the signal by the process of phase conjugation that is implicit in the TR process. Hence each of the N nodes in an array can time-reverse its captured sounding signals independently in an identical or analogous manner. The question now becomes how to align in time the various signals, enabling them to overlap coherently at the RX node.

At this point we assume that the LO at each Tx array node can be described by a phase term $\theta_j = \phi_{cj} + \phi'_{cj}$, a frequency $\omega_{0j}$, and TR reflection time $T_j$. The signal gain/loss term along each path to the RX target is given by $\gamma_j$, and this may include a multipath gain term. Hence, the signal arriving at the RX target is $$p(t) = \sum_{j=1}^{N} \gamma_j A(2T_j + m\Delta t - t)\cos(\omega_1 t - (\omega_1 - \omega_{0j})(2T_j + m\Delta t) + \theta_j),$$

which after in-phase detection has been performed produces the following signal:

$$p_I(t) = \sum_{j=1}^{N} [\gamma_j A_j((2T_j + m\Delta t) - t)\cos(\eta_j)].$$

Using full I/Q detection, the signal may be written thus:

$$P \propto \sqrt{\left[\left(\sum_{j=1}^{N} \gamma_j A_j \cos(\eta_j)\right)^2 + \left(\sum_{j=1}^{N} \gamma_j A_j \sin(\eta_j)\right)^2\right]},$$

where $\gamma_i$ denotes the specific path loss factor on each channel, and $\eta_j = \theta_j - (\omega_1 - \omega_{0j})(2T_j + m\Delta t)$ and $A_j = A((2T_j + m\Delta t) - t)$. It may be re-stated as $$P \propto \sqrt{\sum_{i=1}^{N} \sum_{j=1}^{N} A_i A_j \gamma_i \gamma_j \cos(\eta_i - \eta_j)}.$$

Although the last expression may appear to be a very complex one, it has an immediate advantage. The "fading" component of the term, namely $\cos(\eta_i - \eta_j)$, is a function of phase differences between the elements that are local to the phased array and do not require any knowledge or control of a phase difference between the array and the target. This is an important characteristic, particularly where the target does not communicate with the array.

When the array is configured to implement a common time synchronization where $T_j \rightarrow T$, and a common frequency synchronization of the local oscillators of the array where $\omega_{0j} \rightarrow \omega_0$, then the expression may be reduced to $$P \propto A\Gamma \sqrt{\sum_{i=1}^{N} \sum_{j=1}^{N} \cos(\theta_i - \theta_j)}.$$

The fading term $$\sum_{i=1}^{N}\sum_{j=1}^{N}\cos(\theta_i-\theta_j)$$

can be eliminated with the implementation of phase synchronization across the elements of the array ($\theta_i-\theta_j=0$), achieving P∝AΓN². Configuring the array nodes in this way eliminates fading and produces N² array gain.

The analysis above defines how the array operates when the target can perform I/Q detection. This enables the alignment of the array to be separated from any interaction with the target, and eliminates need for dynamic adjustment of the variables. Hence the target has no need to perform phase alignment to optimize the arriving signal.

A more complex situation arises when I/Q detection is not performed at the target, but only a single phase of the LO is used for downconversion. In this case, the signal recovered may be written as $$p_I(t)=A((2T+m\Delta t)-t)\sum_{j=1}^{N}[\gamma_j A((2T+m\Delta t)-t)\cos(\eta_j)],$$

where $\theta_j'=\theta_j-(\omega_1-\omega_0)(2T+m\Delta t)$.

Without I/Q detection, a residual phase term is left, possibly resulting in fading. The residual phase term has two components. First, there is the $\theta_j$ constant term. Second, there is the constantly varying term $(\omega_1-\omega_0)(2T+m\Delta t)$, which changes with every data bit transmitted. In embodiments, the system is configured so as to impose another synchronization condition operating between the target and the array, i.e., $\omega_1=\omega_0$, which eliminates the data dependent phase term. Assuming local phase synchronization across the array, we are still left with a term $\cos(\theta)$, because local phase synchronization does not alter the relative phase difference between the array and the target. This in fact is more fully expressed as $\cos(\theta_{array}-\theta_{target})\to 1$, and it may require performance of a dynamic phase adjustment at the target (or the array nodes) until $\theta_{array}=\theta_{target}$. Hence in this simpler detection mode, as with normal detection, failing to use I/Q detection may result in fading and makes it desirable to configure the system for dynamic phase alignment between both ends of the communication link (that is, between the array and the target). This added complexity becomes unnecessary if the target can implement I/Q detection.

There may sometimes be circumstances where the target and the array cannot easily communicate status information even if they can implement the main channel communication link, preventing effective dynamic phase alignment from being performed. Another approach may be implemented to alleviate this problem. As mentioned earlier in the single channel description, another solution arises when phase conjugation of the Local Oscillator phase between the incoming and outgoing direction is implemented. Assuming frequency and time synchronization between members of the array, the residual phase term may be eliminated with phase conjugation of the local oscillator where the phase of each LO at the array for incoming signals can be written as $\cos(\omega_0 t+\phi_c)$ and $\sin(\omega_0 t+\phi_c)$, and the outgoing LO phase is $\cos(\omega_0 t-\phi_c)$ and $\sin(\omega_0 t-\phi_c)$. It can be seen that the phase is inverted, $\phi_c\to-\phi_c$. We refer to this as phase conjugation of the Local Oscillator. In this case, the combined phase term of the jth node is $\theta_j=\phi_{cj}-\phi_{cj}=0$, which process now eliminates the phase fading effects. As in the single channel case, this can be implemented in the digital and analog signal processing infrastructure.

Methods for Producing Phase Conjugation of the LO.

It is trivial to produce a phase conjugated cosine or sine signal when the phase $\phi_{cj}$ is known: the phase may be adjusted to the correct value, $-\phi_{cj}$. The problem, however, is that there is no simple way to define the phase of a free running local oscillator, because that requires a definition of time t=0. In embodiments, a shared time sync across the array is implemented, resulting in an implicitly-defined time t=0. This may be the only condition under which correctly defined phase conjugation is implemented. It is similar to how TR can create phase conjugation of the channel propagation phase by defining T. Phase conjugation across the array may be performed by conjugating with respect to a shared time T. We define the reference phase $\cos(\omega_0 T+\phi_c)$ and thus the phase conjugation is the process of $\cos(\omega_0 T+\phi_c)\to\cos(\omega_0 T-\phi_c)$. Once this reference has been established, the signal $\cos(\omega_0 t-\phi_c)$ may be defined.

In summary this allows achieving retrodirection with an array in homodyne operation since both the baseband channel response (CR) is phase conjugated using TR, and the LOs are phase conjugated directly. This enables perfectly aligned retrodirection even when the signal is mixed to IF or baseband, and the receiver cannot perform I/Q detection to remove residual phase offsets.

We have shown theoretically that for retrodirection both the carriers and the modulation envelopes have to be aligned correctly. Below, we illustrate, graphically and verbally, the effects of misalignment of carrier phase, carrier frequency, and data modulation in the following paragraphs.

Data Modulation.

Figure 4:
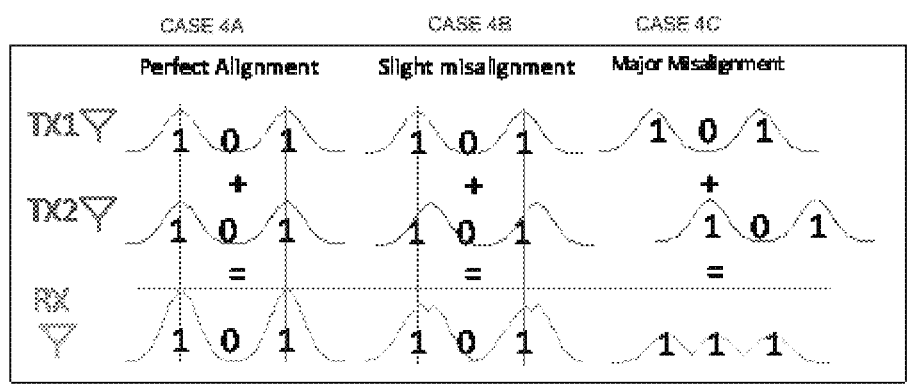
FIG. 4 illustrates selected aspects of modulation alignment and misalignment.

FIG. 4 illustrates some aspects of perfect modulation alignment, slight misalignment of modulation, and severe misalignment of modulation cases. The data sent by TX1 and TX2 should arrive aligned at the RX antenna for the RX to detect the data being sent. When the envelope and phase of the data alone (i.e., stripped carrier) are considered, it can be seen how data misalignment jumbles the incoming signals detected by the RX. In the perfect alignment case 4A on the left of the Figure, the data symbols (envelope of the signal) align at the RX so that ideal array gain may be achieved, assuming carrier alignment. When there is a slight misalignment in the data as in case 4B in the middle, the data may still overlap somewhat, but the signal amplitude will be diminished relative to the perfect alignment case, reducing the total achievable array gain. When there is major misalignment of a whole symbol as in case 4C on the right, the data will be misaligned at the RX, the symbols will not overlap and add coherently. This potentially results in the wrong data stream being detected and an amplitude that approaches a single transmitter case, or in the case of destructive interference, amplitude lower than in the single transmitter case. Symbol period misalignment may be caused by improper time synchronization and determination of time delays with widely distributed arrays or highly disparate multipath delays/decay spreads, for example. It should be noted that the Figure shows essentially amplitude modulated signals. These same considerations apply to more complex modulation formats, e.g., QPSK or BPSK where the data envelopes may have an underlying IF modulation frequency different than the carrier frequency.

Carrier Phase Alignment.

Figure 5:
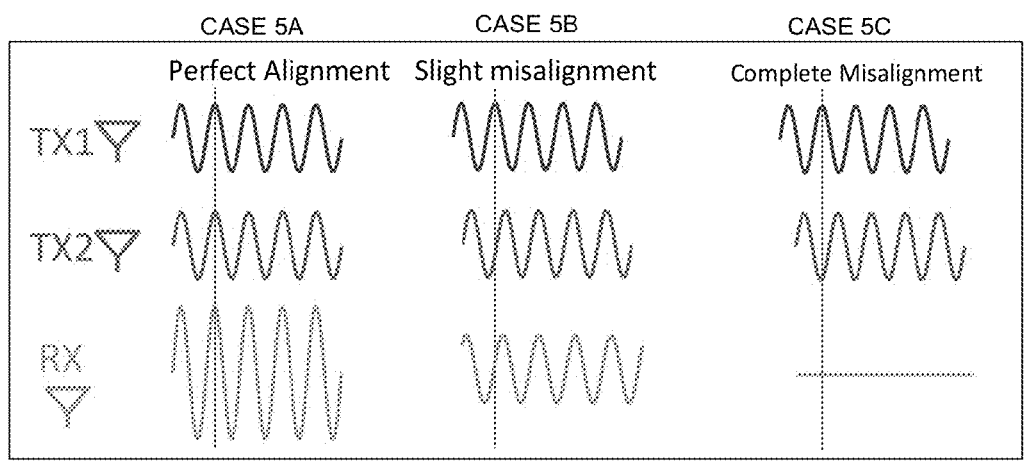
FIG. 5 illustrates selected aspects of carrier alignment and misalignment.

FIG. 5 illustrates some aspects of perfect alignment of carriers, slight misalignment of carriers, and severe misalignment of carriers. Similar to data alignment, carrier alignment is required when the signals arrive at the RX antenna in order to achieve coherent gain of the signals transmitted from TX1 and TX2. To understand the effects of carrier phase alignment, let us assume that TX1 and TX2 both have clocks that oscillate at the same frequency, producing a continuous sinusoidal wave at the frequency. Unlike data alignment which has absolute timing requirements for the data packet to align correctly, carrier alignment is a narrowband process, equating to coherent addition of sine waves. Due to the continuous wave nature of the oscillators, phase is ambiguous, because it can be shifted by multiples 360° (or 2π radians), without change in the observed signal. When there is perfect phase alignment of the continuous wave (CW) carrier signals, the peaks and troughs of the sine waves will add coherently, resulting in twice the amplitude (for equal amplitude carriers). This is shown in case 5A on the left of FIG. 5. When misalignment occurs, the offset sine waves will still combine, but now parts of the peaks and troughs will subtract from each other, resulting in a phase shifted sine wave with diminished amplitude. This is shown in case 5B in the middle of FIG. 5. At the very extreme or complete phase misalignment (180°), the sine waves may be completely incoherent, or faded. This is shown in case 5C on the right of FIG. 5. With unlocked carrier phases, the addition of two sine waves will result in CW signals at the RX that randomly span from completely coherent to completely incoherent. Note that FIG. 5 shows signals without noise; with noise, complete misalignment may not be completely flat.

Carrier phase offsets can be created due to differing intrinsic phases of the LO and different phase lengths of the channel over which the signal must travel. This is similar to compensating time of flight offsets due to differing channel lengths for data symbol alignment. Let us assume the carriers of TX1 and TX2 are phase aligned. If both their flight times to the RX target are equal, their sine waves will process through the equal length channel and remain in phase at the RX target antenna. If the channel lengths differ, one sine wave will process longer and arrive at the RX target with a relative phase offset. With a channel length that results in an odd multiple of 180° phase shifts, the RX will encounter a fade due to differing channels. We call this effect channel phase offset. These effects are similar to local oscillator phase offsets, but are distance- and motion-dependent, and should be compensated quickly if operation with dynamically moving transmitters and/or receivers is desired.

As can be seen, it is possible for the data envelopes to be substantially aligned, but for the underlying carriers to be misaligned. This results in the correct data arriving at the RX target, but the data may experience coherent fading due to the carrier misalignment. We refer to this as carrier misalignment. It may also happen that the carriers are essentially in-phase, but the data envelopes are misaligned, in which case corrupted data will reach the RX target even though it is correctly phased. We may refer to this as symbol period misalignment. It is also possible for a combination of both to occur. Even minor misalignment of the system can result in carrier misalignment.

Carrier Frequency Alignment.

Figure 6:
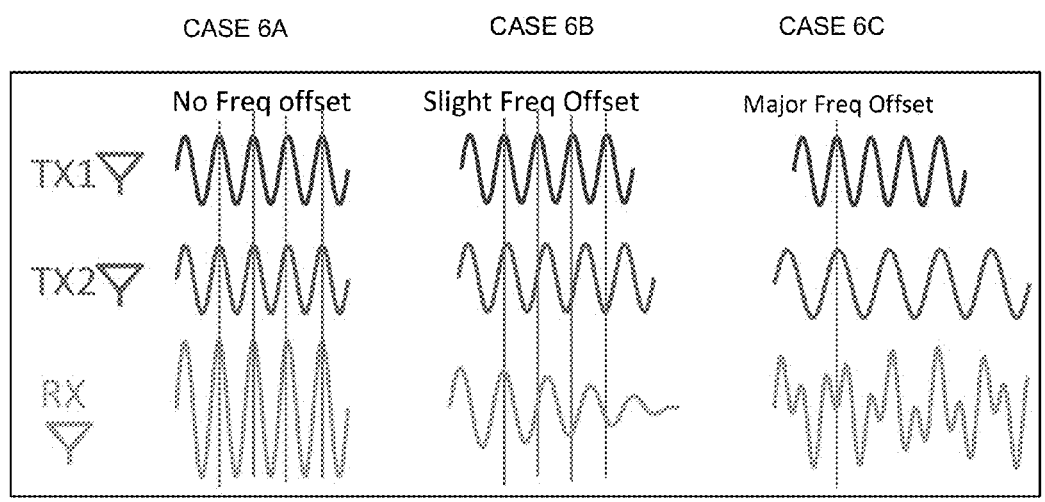
FIG. 6 illustrates selected aspects of the effects of frequency misalignment.
Figure 7:
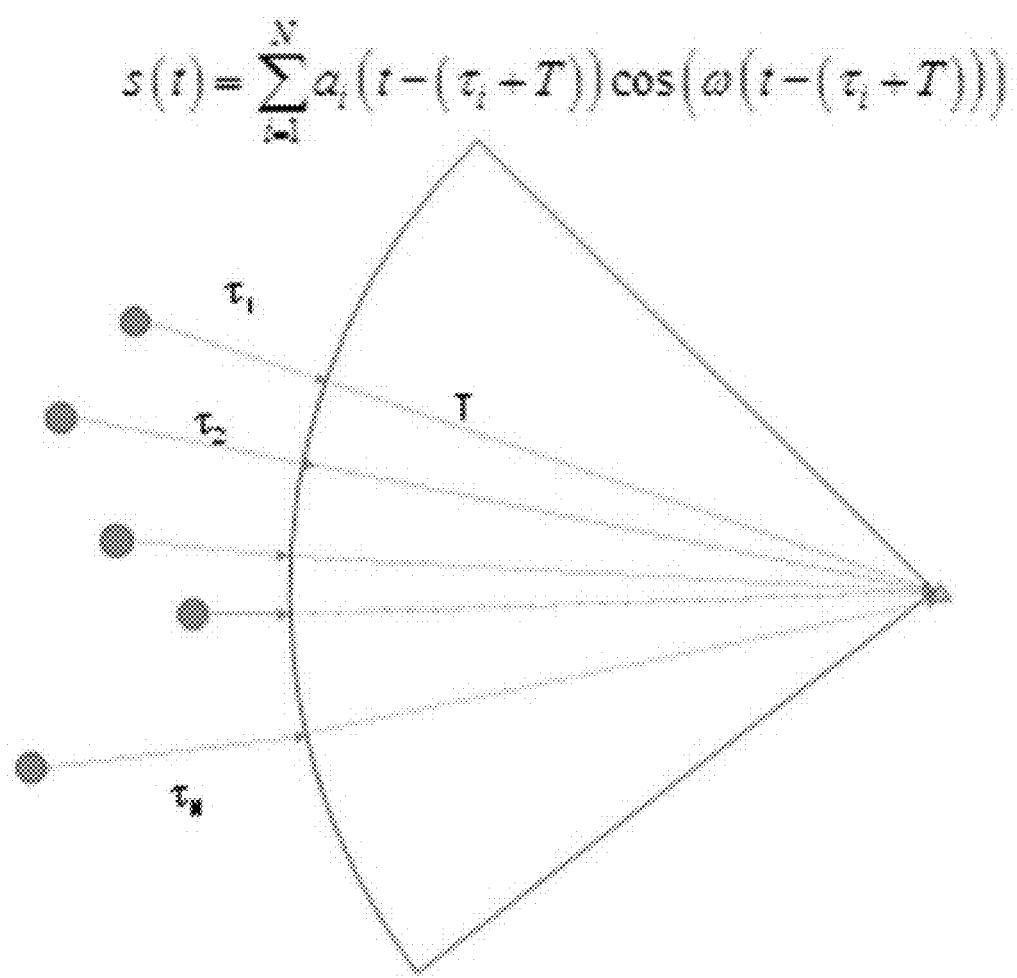
FIG. 7 illustrates selected elements of an open loop basic array.
Figure 8:
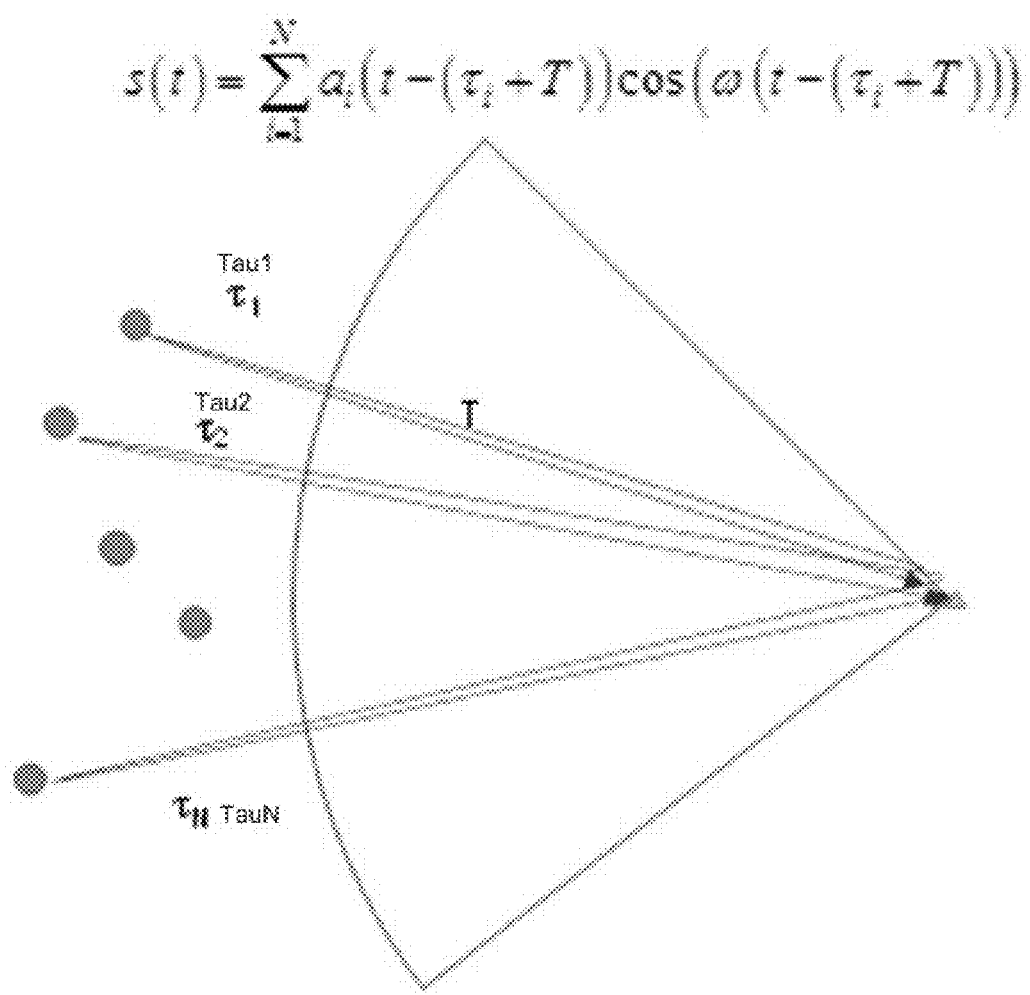
FIGS. 8 and 9 illustrate retrodirective array operation.

While local oscillators may be quite accurate (for example, to within 10 ppm for typical quartz crystal), they have slight frequency offsets from one another. Frequency offsets result in misalignment of the carrier periods (and, over long intervals, data). Thus, even with accurate initial phase alignment of peak or trough, the mismatch in frequency will result in non-coherent gains at the intended RX. As illustrated in FIG. 6, two sine waves with no frequency offset add coherently in time when phases are aligned. This is case 6A on the left of the Figure. When there is a slight frequency offset, the waves add coherently at first, but then begin to diverge, with decreasing amplitude at RX after some time. This is case 6B in the middle of the Figure. When there is a major frequency offset, or a small frequency offset for a longer time, the waves become severely misaligned, case 6C on the right of the Figure.

If the frequencies are different, then the phases will eventually become misaligned. This can be corrected by "refreshing" the system, i.e., realigning the phases. This process is generally disruptive to the smooth operation of the system and its occurrence should be minimized. It is important to keep the frequencies aligned so that the phase alignment persists to an acceptable degree for as long as is appropriate for a given system. The system applications determine how long a reasonable phase coherence must persist before refresh occurs, and consequently this will place a limit on how much frequency misalignment can be tolerated.

Capture Window.

One of the challenges with conventional phased arrays is that even when frequency, time, and phase synchronization has been implemented across a phased array, there still exists the problem of calculating what delays to implement across the array to ensure that the signals arrive at the target in good time alignment, and this information changes as the target location changes.

In embodiments, the array is configured to implement a technique for using TR across the array with an additional process that depends on the time synchronization process, allowing automatic alignment of the signals across the array without the large overhead.

Figure 9:
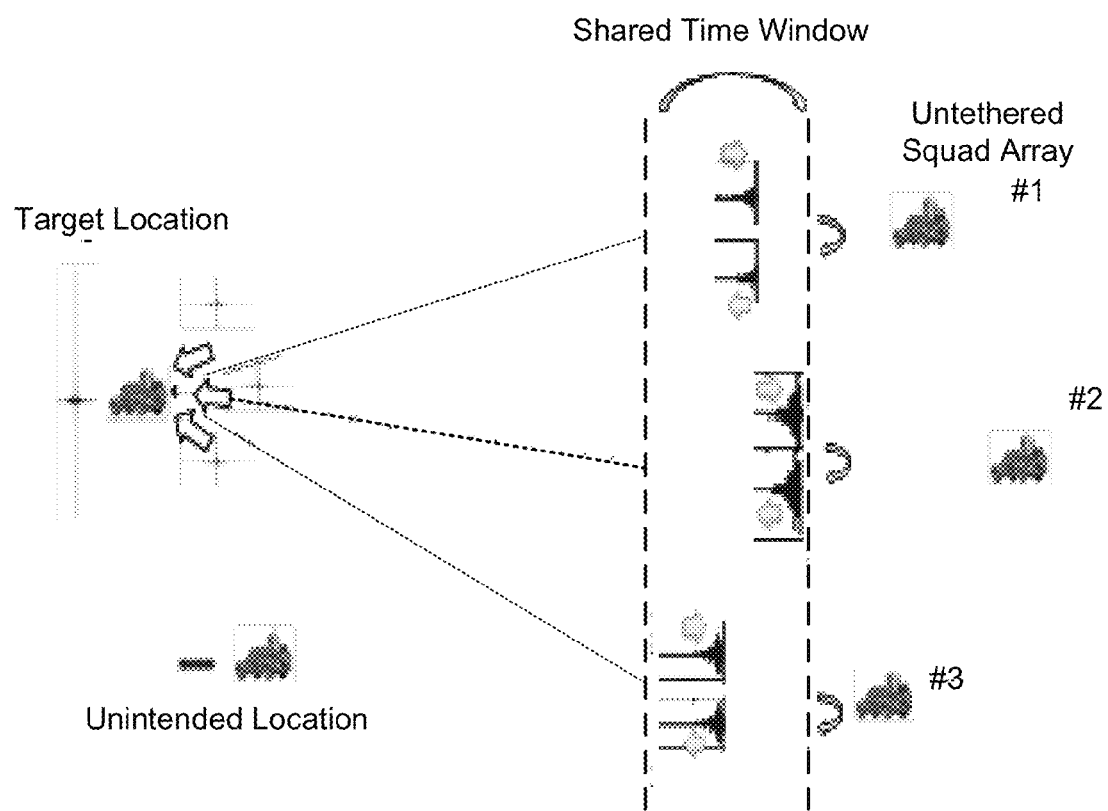

It can be seen from FIG. 9 that according to this approach each node of the array captures the incoming sounding signal in a common time window that is shared by every node of the array. The start of the capture window represents the time that each node starts to record the incoming sounding signal, and the end of the capture window represents the time when each node may finish recording the incoming sounding signal. The node is not required to determine that a signal is actually present when it starts to record, or where the signal is in the window. It simply records for the period of the common capture window, which will result in each node of the array capturing whatever signal arrives. The same sounding pulse may arrive at different times at various nodes due to the fact that the nodes are at different distances from the source of the sounding pulse (that is, from the target). In that case, the nodes may agree on a common start and stop time for the capture window, but the actual incoming signal will appear at different times within that capture window for each particular node, specific to the time of arrival at the particular node. To time-reverse the signal, the elements re-emit the time reversed capture window according to a pre-arranged protocol. There is no requirement to calculate the different delays of signals generated by the sounding pulse and lying within the shared capture window. Also, there is no requirement to adjust the emission times of each array member as the signal is retrodirected. Each array member may simply read back the time-reversed capture window, starting at the same time. As in the capture process, it is the boundaries of the reversed capture windows that become the identical time reference points, not the physical signals contained inside the capture windows. The shared (common) window approach, however, presumes that each element has a clock that is fully synchronized with the clocks in the other array elements, so as to enable the elements to agree on the time boundaries of the window.

In embodiments, a system uses local oscillators to downconvert and upconvert the signals, and only the baseband or IF signals captured in the digital sampling infrastructure are contained in the capture window, thereby reducing the accuracy of time synchronization required. The phase components of the channel propagation paths may be contained in the baseband signal and are managed by the TR process as described above, so the only residual alignment of phases that is required may be ensuring that the phases of the local oscillators are equalized or phase conjugated, as is described above. There is no requirement to align the LOs to compensate for the channel phase, because channel phase alignment is provided by implementing a TR process with a capture window.

It is possible to operate arrays in a mode that is a hybrid of the above-described configurations, depending on the applications. We have stated above that in retrodirective beamforming, only alignment of the capture window boundaries need to be accomplished. A question arises how to ascertain that the time sync across the nodes has successfully aligned the capture window boundaries to produce focusing at the target. It works in theory, but real-life systems may be prone to errors and faults and reductions in the ability to measure time boundaries in low SNR environments may be observed. One of the benefits of a closed loop system is that it can be verified that the process has been correctly implemented. A benefit of the techniques described in this document is that once time-sync has been achieved, the techniques should work for all targets as long as the correct sounding pulse associated with a given target is acquired. Thus, it may be possible to use a cooperative array process to align the members of the array, for example, software-defined radios carried by soldiers in a patrol or squad. One element of the array, which may be referred to as the master, may set itself up as a temporary target, i.e., configure the rest of the array to perform effective beamfocusing on the master as the controlled target. Since the master is actually one of the array nodes, it is reasonably assumed that it can interoperate cooperatively with the other array nodes. In embodiments, the master may also be the clock reference which will be shared between or among the nodes of the array. In embodiments, the master can recognize and identify signals sent by any other node of the array, for example, by the presence of a node-specific pilot embedded in the signal, or other techniques that are known to those skilled in the art. In these embodiments, since the master is a unique node of the system, it may also be able to communicate in a more specialized manner than an arbitrary target receiver and may be able to instruct the other nodes to adjust their parameters until the master determines that an optimal focus is achieved. For example, the master may be able to instruct only Node 1 of the array to adjust its phase until the master observes the focused power maximized. It may then instruct Node 2 of the array to adjust its phase, further enhancing the focus, and so on through the rest of the nodes. This is an iterative optimization which can be done with a closed loop process, which process is available between the master and the other nodes of the array. In embodiments, the nodes emit small amplitude sinusoidal pilot signals embedded into the phase terms of the local oscillators. A small cosinusoidal pilot tone of frequency $\omega_{pilot}$ appearing on a signal that is described essentially by $\cos(\phi+\phi_0 \cos(\omega_{pilot}t))$ should vanish as the signal approaches the maximum or the "peak" of the cosinusoidal signal, i.e., where $\phi \rightarrow 0, 2n\pi$. The master may be configured to instruct the nodes to adjust their phases/delays until it observes all the signals correctly nulled in the focused spot.

To summarize this aspect, the array is configured so that the master node of the array has the ability to set itself up as a proxy target, and then being able to recognize when an alignment process has been improved or even optimized. This allows the array to achieve correct clock synchronization, which can be verified when the array successfully focused on the master. In the process described above, clock synchronization is a pre-requisite for any form of coherent focusing, and in the process described, clock synchronization can be performed independent of any specific target. In other words, once the synchronization process is achieved by focusing on the master, it does not need to be repeated for a different use of the array. The different use may then be beamfocusing on a remote target, which is not part of the array. The master may also participate in the beamfocusing on the remote target as one of the array nodes. In particular, if the master was the clock reference source during the time sync process, then by definition it can insert itself into the array as an array member for beamforming purposes, and its correct alignment should be guaranteed.

Various imperfections in the alignment, for example, frequency offsets of the carriers, may cause the synchronization to degrade, and require it to be re-established periodically.

In the communication applications described above, the multi-element array generally operates according to a pre-agreed protocol that is followed by all the elements of the array. This is not surprising, because it is generally true for systems of networked nodes that are required to interoperate in a network.

Figure 10:
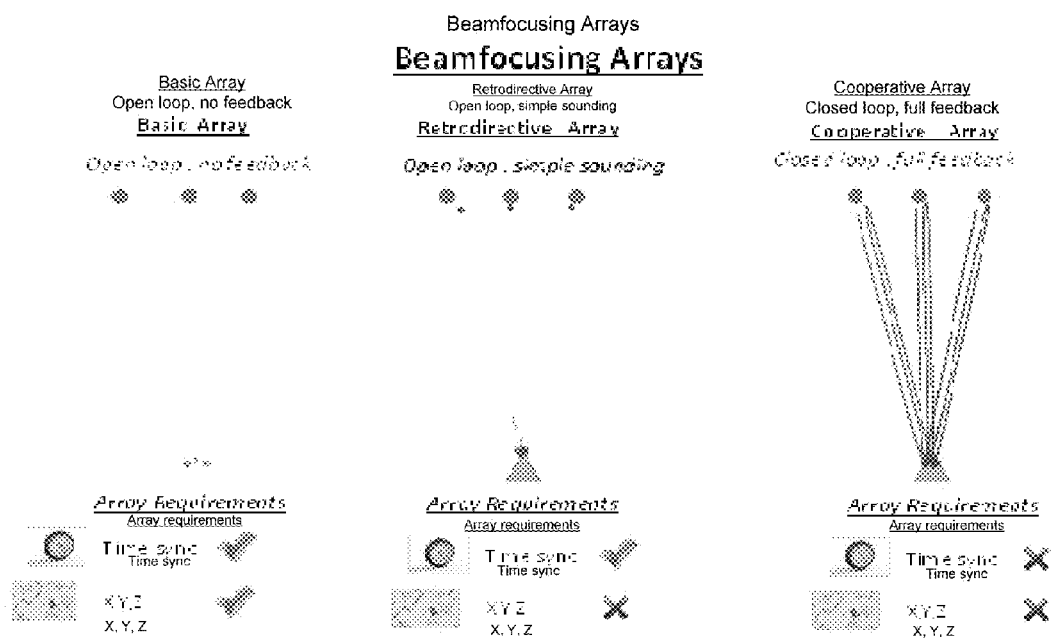
FIG. 10 is a summary diagram of certain attributes of the open loop arrays, retrodirective arrays, and cooperative arrays.

FIG. 10 is a summary diagram of certain attributes of the open loop arrays, retrodirective arrays, and cooperative arrays discussed above.

As we have already mentioned, one type of array of concern here is an array of nodes that are untethered, possibly in motion relative to the target and/or each other, which may be at unknown locations, and with individual LO references. We may refer to such arrays of emitters as Dynamic Phased Arrays (DPA) or ad hoc arrays. Note that the "motion" here may include changes in coordinates, changes in orientation, and changes in both coordinates and orientation. Important issues with such arrays include the scalability of the arrays and the limits imposed on them by their ad hoc (dynamic) nature. In particular, array size, distribution of array elements, accuracy of the clocks of the array elements, and motion of the elements may affect a variety of array performance parameters, such as gain, bandwidth, latency, and beamforming accuracy. Motion of the array nodes may also introduce Doppler shifts, which may under some conditions cause frequency offsets.

In selected embodiments in accordance with this description, a beamforming array utilizes a cooperative approach to produce phase, frequency and time alignment of the elements of the array for transmission to a target receiver, and uses retrodirective array techniques with time-reversal to manage the main channel between the array and the target receiver once the system has determined that the array elements have achieved the requisite alignment properties. In some of these embodiments, the synchronization and beamforming are broken into two stages: (1) carrier phase/frequency alignment, and (2) modulation envelope and phase alignment. This alignment process does not require feedback from the intended receiver to align carriers of the distributed nodes. A typical case where an array separates the carrier alignment process from the pulse envelope alignment process is when the signal at the array is reduced to a baseband or IF frequency for processing purposes, by mixing with a Local Oscillators at the array nodes. In describing such arrays in more detail and in analyzing certain considerations affecting such arrays, this document also examines how the array alignment process as well as the main channel beamfocusing scale with array size, distance between the array members, and distance to the target receiver (the distance between the opposite end of the main channel from the array).

Time, Frequency and Phase Synchronization.

Method of achieving the synchronization of the array. In the discussion of synchronization of the various elements (nodes, member) of the array, N refers the total number of the elements. One of the elements may be designated as the master, that is, the element of the array with some special function such as the responsibility for performing the synchronization. The remaining (N−1) array elements (slaves) perform repeated back and forth communications with the master. Often, the array has more than three elements, so (N−1) is equal to 2 or more. A distance $d_{mean}$ is defined as the average distance of the slave members from the master. Note that $d_{mean}$ is not the average distance between the members, but the average distance to the Master. As will be seen below, the latency of the synchronization process depends, among other factors, on N and $d_{mean}$.

In one example of an embodiment, a round robin algorithm is used: a first slave performs a back and forth alignment process with the master; when the first slave has completed its alignment, another slave takes its turn, and so on until all the slaves sequentially set up the alignment. The latency of synchronization in round robin implementations is dominated by the latency of this algorithm. The latency increases with distance and also in proportion to (N−1).

In an example of alignment process, first phase alignment is performed. For phase alignment, each slave node of the array sends a signal to the master node of the array, which then captures and reflects the signal, thus enabling the slave node to calculate and correct the phase offset relative to the master node. At this point in time, there is no simple way to determine how much of the phase offset resulted from the processing by the master and how much was due to an unknown propagation delay between the two nodes (master node to slave node round trip propagation delay). What is more, at this point, the slave node cannot be assumed to have a defined time reference to allow it to measure the round trip latency which enables it to resolve how much of the phase shift resulted from the propagation delay. However, a second measurement can be made which allows frequency alignment to be established, because frequency is the time derivative of phase. A second phase offset can be measured and the difference between this second phase offset measurement and the previous measurement gives the frequency offset, that is, the difference in the phase offsets over the time between the two phase measurements. The slaves (at least one of the array elements) adjust phase and frequency until no time dependence of phase is observed, within certain predetermined bounds. When the phase offset no longer appears to vary between measurements, the nodes are operating at essentially the same frequency, at least over a time scale long compared to the back and forth latency which even if not yet known precisely can still be estimated. The system is now only limited by the intrinsic coherence of the clocks.

Once common frequency has been established, a process to determine time synchronization and phase alignment is performed.

Time Synchronization and Phase Alignment.

Frequency synchronization establishes a common clock rate. A time interval can now be determined by a protocol. In one embodiment, this protocol may instruct the nodes to define a predetermined time period (e.g., one msec) as a predetermined number (e.g., n) cycles of the common clock. Other embodiments are also feasible. This process can be implemented for example by the Master emitting two pulses pre-defined to be, for example one millisecond apart. Each Slave node then adjusts its clock rate until n cycles, as defined by an agreed protocol, have elapsed between the two received pulses. This allows the Slaves to reach an agreed time synchronization standard that defines a common clock rate and a common time unit standard that are defined by the Master and shared by the Slaves.

Once this shared time standard has been established the Slave nodes can establish a common time standard that allows them, for example, to measure the time delay of a signal sent from the Salve to the Master and then reflected back from the Master. By using the known speed of propagation of the signals, e.g., the speed of light, the Slave can then also infer distances.

After the frequencies are aligned in this manner and a time standard is shared, the Slaves can implement a process where they align the phases of their local oscillators, which is important for the correct operation of the phased-array as described above. In one embodiment, the Slave emit a signal with the phase of the signal linked to its LO phase as described above. The Master then returns this signal to the Slave, which compares the phase of the returning signal to the continuously running phase of the Slave's LO. In one embodiment, the Slaves perform this measurement sequentially, first Slave 1 then Slave 2, etc., enabling the Master to correctly interface with each Slave in a unique manner. Since each Slave now has a time reference, it can also measure the round trip latency and estimate how many cycles, i.e., phase offset of the LO should have evolved during that time period. This number is then compared to the actual measured phase offset and the difference can only be due to any additional phase offset added by the master when it returned the signal emitted by the slave. This information now provides the slave with a mechanism, which in one embodiment allows the slave to adjust its phase until the calculated residual phase offset is nulled. In another embodiment, phase offset is not nulled but the results are stored and used as corrections to be applied at each node when the array subsequently operates in time-reversal mode on the main channel (that is, the channel between the array and the target). To summarize we have described an implementation where the Master is set as a reference node and the Slaves first acquire frequency sync, then apply time sync based on the frequency sync and then perform phase sync by removing phases measured by accurate measurement of the propagation time with respect to signals transmitted between the Slaves and the reference master node.

After each Slave has implemented this process (in a sequential manner or otherwise), each Slave becomes frequency, time, and phase synchronized with the Master. Other embodiments are possible.

As with all physical alignment processes, the system may experience errors and require an iterative correction process.

For example, multiple iterations may be required to produce frequency synchronization or time synchronization that is required to achieve a predetermined level of accuracy or another performance measure.

We have now defined a time synchronization process that permits all nodes of the array to perform actions at the same times. A predefined protocol may be used to label any given time. For example, if all nodes are to perform an action at a specific time (such as launching a signal), the Master may establish the time synchronization, and can apply a time label to a signal. In order to establish correct time sync, the Slaves may correct the time label to allow for the known time delay to the Master, as described above. Once this process has been performed, the nodes can operate with a shared time reference. All descriptions so far have described the time synchronization between the members of the array. This permits the nodes of the array to operate synchronously as a phased array to capture and process signals from an external target.

In one embodiment, this allows the Master to instruct all Slaves to start measuring the Capture Window at a time t=t0 and to finish at time t=t1. The above described alignment process should ensure that all the nodes will indeed be correctly synchronized.

In many conditions, the total phase alignment latency Δt across the entire array, can be shown to vary approximately as $$(N-1)\frac{2d_{mean}}{c},$$

where c is the speed of light, $d_{mean}$ is the mean distance from the target to the array and $$\left(\Delta t \sim (N-1)\frac{2d_{mean}}{c}\right).$$

Initially the frequency alignment may need multiple (e.g., 2, 3, 4, 5, possibly more) iterative repeats of this to reach sufficient accuracy; once the frequency has been aligned, however, subsequent single phase alignment steps may be adequate to perform an adjustment of the frequency for typical Allan variances of a quartz clock. Typical update rates may be 5 milliseconds or less, plus the latency $$\left(\text{which my be } \Delta t = (N-1)\frac{2d_{mean}}{c}\right).$$

Figure 11:
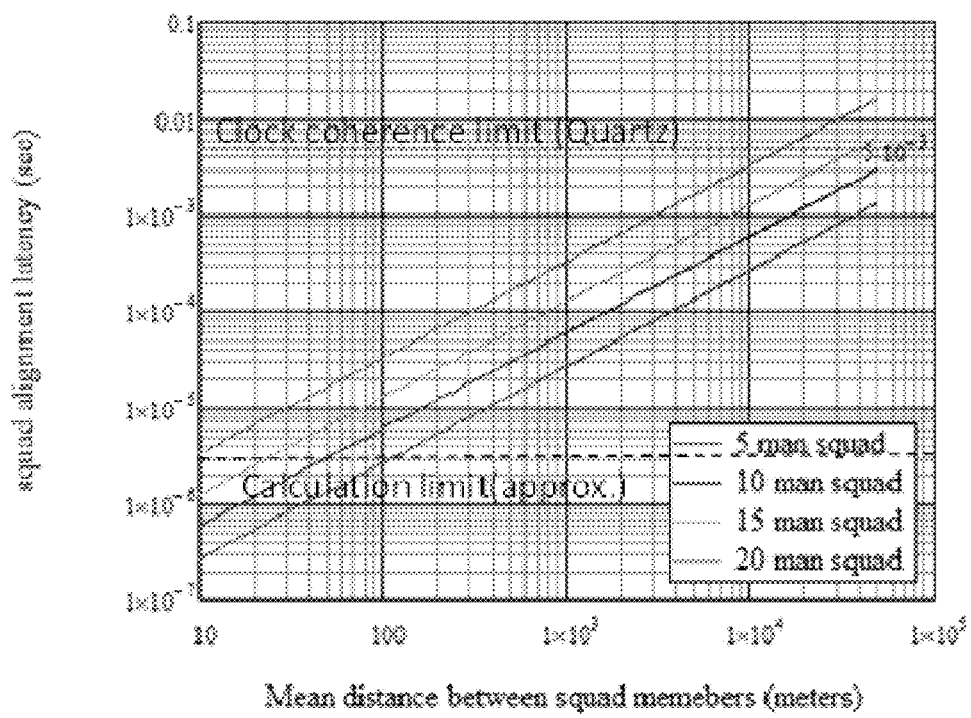
FIG. 11 shows graphs of alignment latency as a function of the mean distances scale for selected arrays.

FIG. 11 shows graphs of alignment latency as a function of the mean distances scale, for 5, 10, 15, and 20 element arrays.

Clearly, as the array increases its scale (i.e., mean separation between the Master and other array elements and/or the number of the array elements increase), the round trip latency required to synchronize the array becomes the dominant factor. It may become greater than any computation time due to calculations which is typically in the 10 s to 100 s of nanoseconds, except for small arrays with low mean separation. However, as the scale of the array continues to increase, at some point a limit will be reached set by the clock coherence. In this extreme case, it may not be possible to align the system rapidly enough, before the clock coherence degraded so far as to require that the alignment be refreshed. However, even when the latencies are relatively small, it may be necessary to repeat the synchronization since the timing sync is eventually lost due to random drift of the clock, rather than deterministic misalignment due to fixed phase and frequency offsets. This is usually determined by the Allan variance of the clocks used; however, any implementation that performs a lot of division and multiplication of clock frequencies and/or other computationally expensive operations may experience timing variances worse that the Allan variance of quartz or an atomic clock. In a particular embodiment, a repeat window of ~5 milliseconds is used, which may be significantly faster (shorter duration) than what is required to stabilize for the Allan variance of quartz. The effective variance for the entire array may be determined by the effective clock coherence time of the entire array.

If each clock in an N element array has a timing variance $\sigma^2$, then the effective variance of the entire array is var=$N\sigma^2$. Hence the effective coherence time of the entire array may be $$\Delta t_{array} = \frac{\Delta t_{coh}}{\sqrt{N}},$$

where $t_{coh}$ is the coherence time of the clocks of the array elements. This helps us understand why operating a dynamic, untethered distributed phased-array is such a challenging process compared to existing state-of-the-art phased-arrays with a distributed high precision central clock.

FIG. 11 shows that, for moderate arrays with even simple quartz clocks, the mean distance of the arrays can be as large as 10 km, which is much larger than what would be practically considered in most ground based scenarios, e.g., a squad of soldiers on patrol in an urban environment, or even for airborne applications such as configuring a "flock" of unmanned aerial vehicles (UAVs) to act as a phased array. This of course does not preclude the use of other clocks, such as atomic clocks, in ground based applications. Atomic clocks may also be more suitable for space-based satellite applications, with their much larger distances and the consequent longer latency of the alignment process.

In embodiments, array nodes are aligned into a distributed time reversal mirror for communication with a target. The nodes use a standard up/down conversion receivers and transmitters, meaning that the array can operate with standard radio architectures using digital signal processing structures in the digital I/Q path of the radio where the signals are processed at an intermediate frequency (IF) or at baseband. For convenience, here we will refer to both the IF frequency and the true baseband signal as "baseband," to distinguish them from the carrier frequency, but this use of the term does not indicate that the signal is necessarily downconverted to DC (zero frequency); it may have a small frequency offset that can be captured by the A/D and D/A samplers/converters. This downconversion is often done to avoid the need to have an A/D and D/A sampling infrastructure operating at the high carrier frequency. It is generally much more economical to have the sampling performed at "baseband." The time synchronization thus only needs to be accurate enough to permit the system to operate at the maximum sampling rate, which is set by the Nyquist criterion at two times the maximum baseband frequency, or some increase over that rate to allow margin for error.

Various algorithms may be employed to separate the symbol time alignment and the carrier phase alignment along with the spatial alignment (beamforming weights). An elegant reciprocity-based method is used to synchronize distributed nodes and determine the optimal beamforming weights to collaboratively communicate to a target receiver. The synchronization and alignment are broken up into separate independent steps, to relax alignment procedure and requirements of the LO Phase, Frequency, Time Offset, and spatial alignment. The array performs the clock alignment using a reciprocal architecture where one node (e.g., slave TX1 of FIG. 3) sends out a signal to another node (e.g., master TX2 of FIG. 3), and TX2 retrodirects that signal (or some processed version of it) back to TX1.

Figure 12:
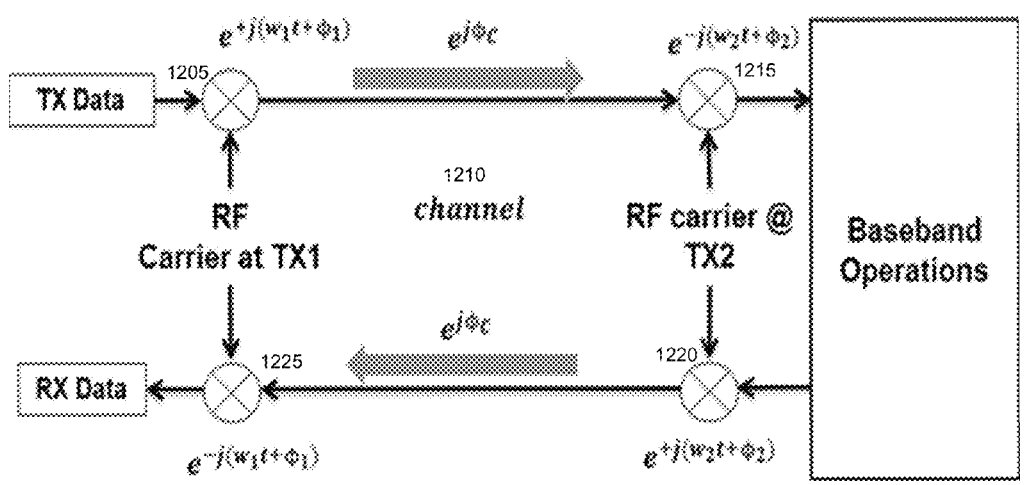
FIG. 12 illustrates selected aspects of operations using upconversion-downconversion architectures.

FIG. 12 illustrates selected aspects of this approach using a standard upconversion-downconversion architecture, where only the difference terms are kept by the receiver because of "baseband" architecture constraints. The transmit data at baseband is first upconverted (the plus sign in the exponent next to the upconverter 1205) using TX1's LO to an RF frequency of $\omega_1$ with phase $\phi_1$. The RF signal is passed through a channel 1210 and undergoes a time-of-flight (channel length/speed of light) dependent phase shift of $\phi_c$. The RF signal sent by TX1 is received by TX2 and then downconverted (the minus sign in the exponent next to a downconverter 1215) using TX2's LO with a carrier RF frequency of $\omega_2$ and phase $\phi_2$. The TX2 node can then do baseband operations or IF operations, in this case at IF frequency ($\omega_1-\omega_2$). These operations are typically at low enough frequency so that they can be performed in an FPGA/CPU. To send the signal back, TX2 upconverts the signal (the plus sign in the exponent next to an upconverter 1220) using its LO. For example, in the case shown the signal is reconverted to $(\omega_1-\omega_2+\omega_2)=\omega_1$. It then sends the signal back to TX1 through the channel 1210 with an additional channel phase shift of $\phi_c$. The TX1 node receives this signal at its antenna and downconverts the signal to baseband with its downconverter 1225. The up/down conversion processes intrinsically measure the phase (and frequency) offset of the incoming signal relative to the phase and frequency of the LO used in the up/down conversion process. Hence, the system can intrinsically keep track of phase and frequency errors between the signal and the local oscillators and can use this information to correct the phase and frequency. It should be noted that when these processes are applied between the array members, time reversal is not used as it was used between the array and the target. Here, the intent is to recover a signal that represents the phase difference between the array nodes so that the LO phases may be corrected, whereas the TR applied on the main channel is intended to eliminate the combined path and LO phase difference.

Techniques other than adjustment of a direct digital synthesizer may be used to compensate TX1's LO. For example, phased-locked loop (PLL) techniques may be used, where the measured phase/frequency differences are used to retune the LO. But the direct digital synthesis (DDS) correction method may be more accurate, and may eliminate the need for special oscillator circuitry.

Phase correction of the carrier may be easier to achieve, because the correction is for relative phase offsets of two continuous wave (CW) signals. Since the signals are CW, phase offsets will be between 0° and 360°, and wrap around with each period. That is, a 10° phase shift is equivalent to a 370°(360°±10°) phase shift. Absolute phase or picosecond time synchronization is not needed here, which may significantly relax measurement requirements.

Described above is the phase alignment process with two nodes (TX1/TX2), and the process may be scaled for N>2 number of nodes. The time alignment may be done in a round-robin fashion pair-wise between the Master and each slave (each of the other nodes). In embodiments, larger arrays with 10 to 100 use this technique.

Frequency offsets can be derived from phase offset measurements by taking the derivative of the phase between the alignments, such as dividing the difference between successive phase offset measurements by the time between the measurements. If DDS is used, the DDS circuitry may update a phase accumulator to track the reference frequency in both phase and frequency. In selected embodiments, this method is limited to a frequency acquisition range proportional to limiting the phase change to a maximum of a single cycle over the refresh interval. This limitation may be overcome by using a coarse frequency offset at system start-up and/or other times.

The second step of the synchronization process, time-alignment of data at the modulation bandwidth, may be performed to within some fraction (e.g., 1/10 for within about −0.5 dB of ideal) of the modulation envelope. This significantly relaxes the timing accuracy needed. For 1 MSamp/sec, for example, $$\frac{1}{BW_{mod}} \times 10\% = 100 \text{ ns.}$$

In embodiments designed to operate for node distance differences less 100 ft, relative time alignment of the modulation envelope may be unnecessary, because the time-of-flight differences are small. With larger node distance differences, time alignment may be needed, particularly at the nanosecond time scale. This may be significantly easier than picosecond time alignment of other techniques.

Figure 14:
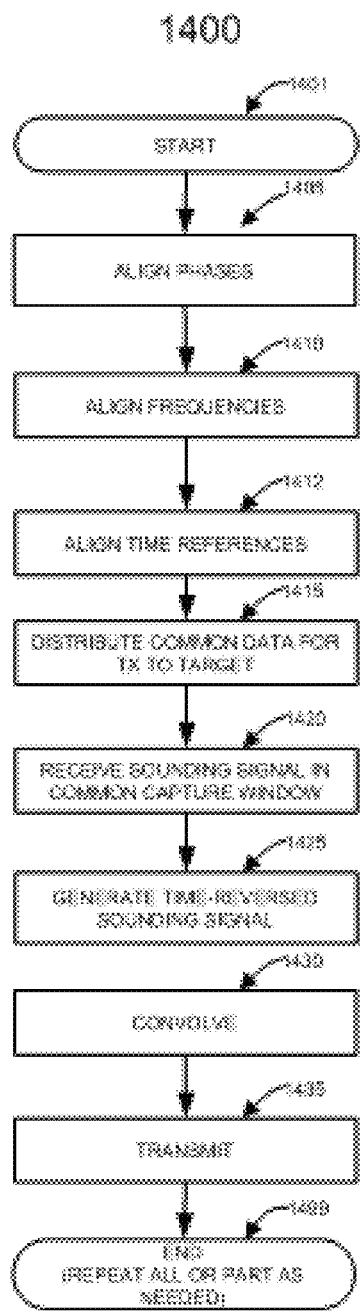
FIG. 14 illustrates selected steps of a process for communication from an array of nodes to a target.

FIG. 14 shows a process 1400 for communications from an array of nodes to a target. At flow point 1401, the nodes are powered up and ready to operate.

In step 1405, phases of local clock references of all nodes of the plurality of radio frequency transmission nodes are aligned.

In step 1410, frequencies of the local clock references of all nodes of the plurality of radio frequency transmission nodes are aligned.

In step 1412, time references of all the nodes are aligned.

In step 1415, the data for transmission to the target is obtained at each node.

In step 1420, the nodes receive a sounding signal from the target.

In step 1425, each node generates a time-reversed sounding signal at carrier frequency, using (1) sample readout reversal at baseband, and (2) phase-conjugation at carrier frequency.

In step 1430, the nodes convolve the common data with the time-reversed sounding signal, to obtain transmission signal.

In step 1435, the nodes transmit the transmission signals so as to focus on the target in space and time.

At flow point 1499, the process may end, to be repeated in part or in whole as needed.

The features described throughout this document may be present individually, or in any combination or permutation, except where the presence or absence of specific elements/steps/limitations is inherently required, explicitly indicated, or otherwise made clear from the context.

Although the process steps and decisions (if decision blocks are present) may be described serially in this document, certain steps and/or decisions may be performed by separate elements in conjunction or in parallel, asynchronously or synchronously, in a pipelined manner, or otherwise. There is no particular requirement that the steps and decisions be performed in the same order in which this description lists them or the Figures show them, except where a specific order is inherently required, explicitly indicated, or is otherwise made clear from the context. Furthermore, not every illustrated step and decision block may be required in every embodiment in accordance with the concepts described in this document, while some steps and decision blocks that have not been specifically illustrated may be desirable or necessary in some embodiments in accordance with the concepts. It should be noted, however, that specific embodiments/variants/examples use the particular order(s) in which the steps and decisions (if applicable) are shown and/or described.

The instructions (machine executable code) corresponding to the method steps of the embodiments, variants, and examples disclosed in this document may be embodied directly in hardware, in software, in firmware, or in combinations thereof. A software module may be stored in volatile memory, flash memory, Read Only Memory (ROM), Electrically Programmable ROM (EPROM), Electrically Erasable Programmable ROM (EEPROM), hard disk, a CD-ROM, a DVD-ROM, or other form of non-transitory storage medium known in the art. Exemplary storage medium or media may be coupled to one or more processors so that the one or more processors can read information from, and write information to, the storage medium or media. In an alternative, the storage medium or media may be integral to one or more processors.

This document describes in detail the inventive apparatus, methods, and articles of manufacture for communications and other techniques using distributed cooperating nodes. This was done for illustration purposes and, therefore, the foregoing description is not necessarily intended to limit the spirit and scope of the invention(s) described. Neither the specific embodiments of the invention(s) as a whole, nor those of their features necessarily limit the general principles underlying the invention(s). The specific features described herein may be used in some embodiments, but not in others, without departure from the spirit and scope of the invention(s) as set forth herein. Various physical arrangements of components and various step sequences also fall within the intended scope of the invention(s). Many additional modifications are intended in the foregoing disclosure, and it will be appreciated by those of ordinary skill in the pertinent art that in some instances some features will be employed in the absence of a corresponding use of other features. The embodiments described above are illustrative and not necessarily limiting, although they or their selected features may be limiting for some claims. The illustrative examples therefore do not necessarily define the metes and bounds of the invention(s) and the legal protection afforded the invention(s).

What is claimed is:

1. A method of configuring a plurality of radio frequency transmission nodes into a distributed time reversal mirror for transmitting to a target, the method comprising:
   step for phase alignment of local clock references of all nodes of the plurality of radio frequency transmission nodes;
   step for frequency alignment of the local clock references of all nodes of the plurality of radio frequency transmission nodes;
   receiving a sounding signal from a target within a time capture window common to the plurality of radio frequency transmission nodes; and
   generating a time-reversed sounding signal at carrier frequency using sample-reversal of the time capture window at baseband and phase-conjugation of the sounding signal at carrier frequency.

2. A method as in claim 1, wherein modulation envelope of the nodes are not aligned.

3. A method as in claim 1, wherein the step for frequency alignment is based on repetitions of the step for phase alignment.

4. A method as in claim 1, wherein a first node of the plurality of radio frequency transmission nodes is designated as Master and the step for phase alignment is performed in a round-robin manner.

5. A method of configuring a plurality of radio frequency transmission nodes into a distributed time reversal mirror for transmitting to a target, the method comprising steps of:
   aligning phases of local clock references of all nodes of the plurality of radio frequency transmission nodes;
   aligning frequencies of the local clock references of all nodes of the plurality of radio frequency transmission nodes;
   aligning time references of all nodes of the plurality of radio frequency transmission nodes;
   distributing common data for transmission to the target across the plurality of nodes;
   receiving, at each node of the plurality of nodes, a sounding signal from the target within a common time capture window;
   generating, at said each node, a time-reversed sounding signal at carrier frequency, the time-reversed sounding signal of said each node being generated by sample-reversal of the common time capture window at baseband and phase-conjugation at carrier frequency;
   convolving, at said each node, the common data with the time-reversed sounding signal, thereby obtaining a transmission signal of said each node; and
   transmitting, from said each node, said transmission signal of said each node, wherein the step of transmitting is performed at the same time from all the nodes of the plurality of nodes for coherent time-reverse focusing on the target in time and space.

6. A method as in claim 5, wherein the steps of generating and convolving are performed using I/Q processing.

7. A method as in claim 6, wherein the step of aligning frequencies comprises iterative node-to-node phase offset measurements.

8. A method as in claim 6, wherein the step of aligning time references comprises step for time alignment of all nodes of the plurality of radio frequency transmission nodes.

9. A method as in claim 6, wherein the plurality of nodes comprises a master node and at least two slave nodes, the method further comprising:
   configuring the at least two slave nodes to focus time-reversed master sounding emissions on the master node in time and space; and
   attempting to optimize reception of the emissions at the master node;
   wherein the steps of configuring and attempting are performed before the step of transmitting.

10. A node comprising an antenna, a radio frequency transceiver coupled to the antenna, a local oscillator, and a processor coupled to the transceiver to control operation of the transceiver, wherein the node is part of a plurality of nodes, the node comprising:

means for phase alignment of the local oscillator with the local oscillators of other nodes of the plurality of nodes;

means for frequency alignment of the local oscillator with of the local oscillators of the other nodes of the plurality of nodes;

a receiver of a sounding signal from a target within a time capture window common to the plurality of nodes; and a generator of a time-reversed sounding signal at carrier frequency using sample-reversal of the time capture window at baseband and phase-conjugation of the sounding signal at carrier frequency.

11. A node as in claim 10, wherein the node is configured to obtain common data for transmission from the plurality of nodes to the target;

convolve the common data with the time-reversed sounding signal, thereby obtaining a transmission signal; and transmit the transmission signal, wherein all the nodes of the plurality of nodes transmit simultaneously for coherent time-reverse focusing of transmissions carrying the common data on the target in time and space.

12. A node as in claim 11, wherein the node is configured to generate the time-reversed sounding signal and to convolve the common data using I/Q processing.

13. A node as in claim 12, wherein the means for frequency alignment is configured to perform iterative node-to-node phase offset measurements.

14. A node as in claim 12, further comprising means for time synchronization with at least one other node of the plurality of nodes.

15. An article of manufacture comprising machine-readable storage medium with program code stored in the medium in a non-volatile manner, the program code, when executed by at least one processor of a node comprising an antenna, a radio frequency transceiver coupled to the antenna, a local oscillator, and a processor coupled to the transceiver to control operation of the transceiver, wherein the node is part of a plurality of radio frequency transmission nodes, configures the node to perform:

phase alignment of local clock references of all nodes of the plurality of radio frequency transmission nodes;

frequency alignment of the local clock references of all nodes of the plurality of radio frequency transmission nodes;

receive a sounding signal from a target within a time capture window common to the plurality of radio frequency transmission nodes; and generate a time-reversed sounding signal at carrier frequency, the time-reversed sounding signal being generated by sample-reversal of the time capture window at baseband and phase-conjugation at carrier frequency.

16. An article of manufacture as in claim 15, wherein the program code, when executed by the at least one processor, further configures the node to:

obtain common data for transmission from the plurality of radio frequency transmission nodes to the target;

convolve the common data with the time-reversed sounding signal, thereby obtaining a transmission signal; and transmit said transmission signal, wherein the step of transmitting is performed at the same time from all the nodes of the plurality of radio frequency transmission nodes for coherent focusing on the target in time and space.

* * * * *

UNITED STATES PATENT AND TRADEMARK OFFICE
CERTIFICATE OF CORRECTION

PATENT NO. : 9,548,799 B2  Page 1 of 1
APPLICATION NO. : 14/247229
DATED : January 17, 2017
INVENTOR(S) : Hsu et al.

It is certified that error appears in the above-identified patent and that said Letters Patent is hereby corrected as shown below:

In the Claims

Column 30, Line 4, cancel "from a target" and replace the cancelled text with --from the target--;

Column 30, Line 11, cancel "envelope" and replace the cancelled text with --envelopes--;

Column 31, Line 7, cancel "of the local" and replace the cancelled text with --the local--.

Signed and Sealed this
Fourteenth Day of March, 2017

Michelle K. Lee
*Director of the United States Patent and Trademark Office*